(12) United States Patent
Yajko

(10) Patent No.: US 9,996,765 B2
(45) Date of Patent: Jun. 12, 2018

(54) DIGITAL IMAGING FOR DETERMINING MIX RATIO OF A COATING

(71) Applicant: The Sherwin-Williams Company, Cleveland, OH (US)

(72) Inventor: Michael Paul Yajko, Peninsula, OH (US)

(73) Assignee: THE SHERWIN-WILLIAMS COMPANY, Cleveland, OH (US)

(*) Notice: Subject to any disclaimer, the term of this patent is extended or adjusted under 35 U.S.C. 154(b) by 0 days. days.

(21) Appl. No.: 15/405,681

(22) Filed: Jan. 13, 2017

(65) Prior Publication Data

US 2017/0132799 A1  May 11, 2017

Related U.S. Application Data

(63) Continuation-in-part of application No. 14/645,623, filed on Mar. 12, 2015, now Pat. No. 9,582,899.

(Continued)

(51) Int. Cl.
| | |
|---|---|
| *G06K 9/00* | (2006.01) |
| *G06K 9/46* | (2006.01) |
| *G06T 7/90* | (2017.01) |
| *G01B 11/30* | (2006.01) |
| *G06T 7/00* | (2017.01) |

(52) U.S. Cl.
CPC .......... *G06K 9/4652* (2013.01); *G01B 11/306* (2013.01); *G06K 9/00624* (2013.01); *G06K 9/00671* (2013.01); *G06T 7/0004* (2013.01); *G06T 7/90* (2017.01); *G06T 2207/10024* (2013.01); *G06T 2207/10048* (2013.01);

(Continued)

(58) Field of Classification Search
CPC .......... G06K 9/00624; G06K 9/00671; G06K 9/4652; G06T 2207/10024; G06T 2207/10048; G06T 2207/20221; G06T 2207/30156; G06T 7/0004; G06T 7/90; G01B 11/306
See application file for complete search history.

(56) References Cited

U.S. PATENT DOCUMENTS

| | | |
|---|---|---|
| 5,091,647 A | 2/1992 | Carduner |
| 5,396,080 A | 3/1995 | Hannotiau et al. |

(Continued)

FOREIGN PATENT DOCUMENTS

| | | | |
|---|---|---|---|
| JP | 2007-316019 A1 | 12/2007 | |
| JP | 2009-103523 | * 5/2009 | ............. G01N 21/65 |

(Continued)

OTHER PUBLICATIONS

M. Barth et al. ("A color vision system for microelectronics: Application to oxide thickness measurements". IEEE 1986, vol. 3, 1986, pp. 1242-1247).*

(Continued)

*Primary Examiner* — Amara Abdi
(74) *Attorney, Agent, or Firm* — Jones Day

(57) ABSTRACT

A method performed by an electronic device includes storing a correlation between spectral data values and mix ratio values of components of a mixture. Spectral data is acquired from a coating, of the mixture, that is applied to a substrate. A mix ratio, of the components that are in the coating, is determined from the acquired spectral data based on the stored correlation.

20 Claims, 21 Drawing Sheets

Related U.S. Application Data

(60) Provisional application No. 61/951,603, filed on Mar. 12, 2014.

(52) U.S. Cl.
CPC .............. *G06T 2207/20221* (2013.01); *G06T 2207/30156* (2013.01)

(56) References Cited

U.S. PATENT DOCUMENTS

| | | | |
|---|---|---|---|
| 5,856,871 | A | 1/1999 | Cabib |
| 6,088,487 | A | 7/2000 | Kurashige |
| 6,317,575 | B1 | 11/2001 | Kumar et al. |
| 7,513,964 | B2 | 4/2009 | Ritter |
| 7,934,467 | B2 | 5/2011 | Morton |
| 7,981,462 | B2 | 7/2011 | Bustgens |
| 8,605,940 | B1 | 12/2013 | Wilensky |
| 2004/0121268 | A1 | 6/2004 | Conroy |
| 2004/0223165 | A1 | 11/2004 | Kurokawa et al. |
| 2006/0034536 | A1 | 2/2006 | Ogren et al. |
| 2007/0074664 | A1* | 4/2007 | Nishimura ............ C23C 16/272 118/723 E |
| 2008/0249716 | A1* | 10/2008 | Huang .................... G06F 17/50 702/30 |
| 2008/0285840 | A1 | 11/2008 | Kawai |
| 2010/0143089 | A1 | 6/2010 | Hvass |
| 2010/0169255 | A1* | 7/2010 | Fujieda .................... G01J 3/46 706/25 |
| 2011/0032546 | A1 | 2/2011 | Dalal |
| 2011/0150326 | A1 | 6/2011 | Jeong |
| 2014/0076985 | A1* | 3/2014 | Pettersson ............. B05B 12/122 239/11 |
| 2014/0096925 | A1* | 4/2014 | Gorden ................... D21F 5/181 162/111 |

FOREIGN PATENT DOCUMENTS

| | | | | |
|---|---|---|---|---|
| WO | WO 2007/054840 | * | 5/2007 | ............... B05C 1/08 |
| WO | WO 2007/054840 A1 | | 5/2007 | |

OTHER PUBLICATIONS

M. Barth et al. "A color vision system for microelectronics: Application to oxide thickness measurements". Proceedings. 1986 IEEE International Conference on Robotics and Automationa, vol. 3, 1986, pp. 1242-1247.

Ashish Vijay Karnat: "An investigation of image processing techniques for paint defect detection, using a machine vision system" 2004, retrieved from the Internet: URL https://uknowledge.uky.edu/cgi/de&httpsredir=1&article=1335&context=gradschool_thesis [retrieved Nov. 21, 2017] abstract; p. 1, paragraph 1; p. 5, paragraph 1; p. 53-p. 87; p. 90.

N Hwang et al: "Rust Surface Area Determinaion of Steel Bridge Component for Robotic Grit-Blast Machine", ISARC. Proceedings of the International Symposium on Automation Oand Robotics in Constructions. vol. 30, Jan. 2013 (Jan. 2013), p. 1.

EPO Communication dated Dec. 8, 2017, enclosing extended European search report.

PCT International Search Report for PCT/US2015/20089 dated Jul. 13, 2015.

PCT Written Opinion for PCT/US2015/20089 dated Jul. 13, 2015.

PCT Notification Concerning Transmittal of International Preliminary Report on the Patentability, dated Sep. 22, 2016, from related/corresponding PCT Patent Application Serial No. PCT/US15/20089, filed Mar. 12, 2015.

Notification of Transmittal or Search Report and the Written Opinion of the International Searching Authority, or the Declaration; International Search Report and Written Opinion, dated Feb. 20, 2018 for PCT/US18/13075.

\* cited by examiner

DIGITAL IMAGING FOR DETERMINING MIX RATIO OF A COATING

CROSS-REFERENCE TO RELATED APPLICATIONS

This is a continuation-in-part of U.S. application Ser. No. 14/645,623, filed Mar. 12, 2015, which claims priority from U.S. Provisional Application No. 61/951,603, filed on Mar. 12, 2014, both of these applications being incorporated herein by reference.

TECHNICAL FIELD

This is related to systems and methods for performing digital image processing related to coatings and displaying, and more particularly, to systems and methods providing real-time enhanced digital imaging for the prediction, application, and inspection of coatings.

BACKGROUND

In some applications, the resultant thickness of a coating (e.g., a paint) that is applied to a substrate (e.g., the surface of a metal substrate) by a user may be critical, or at least important, to provide desired performance (e.g., proper protection of the substrate). For example, achieving a specified thickness of an applied coating may be critical to preventing corrosion of a metal substrate used in marine applications. Self-inspecting coatings are used in applications such as, for example, marine applications and oil and gas pipeline applications. A self-inspecting coating often includes a coating (e.g. liquid or powder) that provides a visual indication (e.g., visible or invisible to naked eyes) of coating properties (such as thickness). As an example, the visual indication of the coating properties may be provided as the coating is applied or after the coating is applied. For example, a color of the coating can change as the applied thickness changes, in accordance with an embodiment. In this manner, a user is able to perform a certain level of self-inspecting as the user applies the coating. That is, the user may visually observe the color of the coating as it is applied to the substrate in an attempt to determine if the thickness is correct. However, the ability of a user to discern variations in color (and, therefore, variations in the coating film) by observing the coating with the naked eye is limited.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Systems and methods providing digitally enhanced imaging for the prediction, application, and inspection of coatings are disclosed. While many of the embodiments are described as occurring in "real-time," it should be understood that the systems and methods described herein can be used in real-time as well as with a delay in processing or analyzing an image. A real-time digital imaging and processing device provides real-time image acquisition, processing, and display of acquired digital imaging data to allow a user to discern variations (e.g., variations in the thickness of a self-inspecting coating being applied to the substrate) beyond that which can be discerned by observing with the naked eye. The real-time digital imaging and processing device may also provide pre-coating and post-coating inspection capabilities as well as coating prediction capabilities.

Additionally various embodiments of systems and methods may provide real-time enhanced digital imaging methods including but not limited to the use of; calibration, optical lenses, controlled light source, stereoscopy, multi-spectral imaging (e.g., both real-time and still image coating inspection via multi-spectral analysis may be of interest), digital identification (e.g., using a QR code), location and orientation based services, coatings with designed chromism, stationary devices, portable devices, remote devices, and wearable devices. Functionality may include but is not limited to; recordability, non-recordable, point detection, mix ratio determination, non-contact color matching, metamerism prediction, light source calibration, substrate calibration, coating calibration, display calibration, quantification, definable deviation, definable tolerances, visual film thickness determination, profile recognition/determination, and non-contact film thickness metering (i.e., quantified film thickness).

An embodiment of the present invention provides a method. The method includes acquiring real-time digital imaging data of a coating being applied to a substrate; performing real-time digital image processing on the real-time digital imaging data to generate enhanced real-time digital imaging data, wherein the enhanced real-time digital imaging data provides an enhanced differentiation between colors in the digital imaging data, and wherein each color in the enhanced real-time digital imaging data correlates to a thickness of the applied coating; and displaying a visual representation of the enhanced real-time digital imaging data.

Another embodiment of the present invention provides a method. The method includes digitally imaging a substrate to be coated to acquire digital imaging data; digitally processing the digital imaging data to enhance the digital imaging data, thereby generating enhanced digital imaging data; digitally processing the enhanced digital imaging data to quantify a level of surface characteristics, such as contamination on the substrate or substrate variations; and displaying at least one of a visual representation of the level of surface contamination and a visual representation of the enhanced digital imaging data.

An embodiment of the present invention provides a method. The method includes acquiring real-time digital imaging data of a coating that has been applied to a substrate; performing real-time digital image processing on the real-time digital imaging data to generate enhanced real-time digital imaging data, and display a visual representation of the enhanced real-time digital imaging data wherein the enhanced real-time digital imaging data provides an enhancement in visual appearance.

An embodiment of the present invention provides a method. The method includes acquiring real-time digital imaging data of a coating before it has been applied to a substrate; performing real-time digital image processing on the real-time digital imaging data to generate enhanced real-time digital imaging data, and display a visual representation of the enhanced real-time digital imaging data wherein the enhanced real-time digital imaging data provides an enhancement in visual appearance (e.g., inspection of wet paint in production or in can).

A further embodiment of the present invention provides a method. The method includes selecting at least one color on a digital imaging and processing device; digitally imaging an object (e.g., an interior of a room) to be painted to acquire digital imaging data using the digital imaging and processing device; digitally processing the digital imaging data using the digital imaging and processing device to: segment the different surfaces of the object to be painted from each other in the digital imaging data, and apply the at least one color to one or more of the surfaces in the digital imaging data to generate enhanced digital imaging data; and displaying a visual representation of the enhanced digital imaging data on a display screen of the digital imaging and processing device.

In an embodiment, a processor-implemented system includes one or more processors. The processors are configured to acquire original image data from a coating material applied to a substrate surface, enhance a spectral response differentiation in the original image data to generate enhanced image data, acquire spectral response data associated with one or more light sources based at least in part on the enhanced image data, acquire coating thickness data of the coating material, and determine an interrelationship between the spectral response data associated with the one or more light sources and the coating thickness data of the coating material. One or more non-transitory machine-readable storage media are for storing the original image data, the enhanced image data, the spectral response data, the coating thickness data, and a data structure for the interrelationship between the spectral response data associated with the one or more light sources and the coating thickness data of the coating material.

In different embodiments, the spectral response differentiation can be enhanced based at least in part on one or more spectral fingerprints of one or more non-visible components in the coating material. The processors can be further configured to apply one or more image processing filters to generate the enhanced image data. The image processing filters might include one or more infrared bandwidth spectral optical filters. The image processing filters might include one or more ultra-violet bandwidth spectral optical filters. The spectral response data might include infrared bandwidth spectral responses associated with one or more non-visible components in the coating material. The spectral response data might include ultra-violet bandwidth spectral responses associated with one or more non-visible components in the coating material. The processors might determine a formula associated with the interrelationship between the spectral response data associated with the one or more light sources and the coating thickness data of the coating material, and calculate the data structure for the interrelationship using the formula. The processors might determine the formula using a linear regression method based at least in part on the spectral response data associated with the one or more light sources and the coating thickness data of the coating material. The formula might indicate that a coating thickness is a function of a spectral response, given the substrate surface and the one or more light sources.

The processors might further perform a spectral response measurement to acquire the spectral response data, perform a thickness measurement to acquire the coating thickness data, and generate the data structure for the interrelationship between the spectral response data associated with the one or more light sources and the coating thickness data of the coating material, wherein the data structure includes one or more spectral response fields for storing the spectral response data and one or more coating thickness fields for storing the coating thickness data, the spectral response data being mapped to the coating thickness data in the data structure.

The processors might acquire test image data from the coating material applied to a test surface, enhance a spectral response differentiation in the test image data to generate enhanced test image data, determine test spectral response data based at least in part on the enhanced test image data, process a database query that operates over the spectral response fields and the coating thickness fields based at least in part on the test spectral response data, and output a test thickness of the coating material according to the database query.

The processors might acquire the original image data in real-time. The processors might perform one or more image processing operations to generate the enhanced image data in real-time. The enhanced image data might be used with coatings-related metadata for alerting and notification operations associated with out-of-tolerance conditions. The image processing operations might include one or more of color mapping, contrast manipulation, histogram equalization, brightness control, masking using spatial convolution kernels, filtering, compression, thresholding, convolution, correlation, segmentation, multi-spectral band ratioing, intensity-hue-saturation (IHS) transformation, spatial convolution filtering, directional filtering, image subtraction, image magnification, layering, focusing, de-focusing, mirroring, and spatial alignment. The processors might display the enhanced image data. The processors might be further configured to scan a code to identify the coating material and select one or more predetermined image processing operations and one or more predetermined parameters associated with the coating material for generating the enhanced image data. The one or more predetermined parameters associated with the coating material might include one or more calibration factors. The processors might perform a calibration process to correlate one or more substrate surfaces, one or more coating materials, or one or more light sources to a standard. The processors might be further configured to image the substrate surface to be coated to acquire substrate imaging data, enhance a spectral response differentiation in the substrate imaging data to generate enhanced substrate imaging data, and process the enhanced substrate imaging data to quantify a level of contamination on the substrate surface. The processors might display a visual representation of the level of contamination. The processors might display a visual representation of the enhanced substrate imaging data. The processors might process the enhanced substrate imaging data to identify one or more types of contamination on the substrate surface.

The processors might select inspection presets associated with a particular type of contaminant before the substrate surface is imaged. The processors might be further configured to process the substrate imaging data to calculate an area of the substrate surface to be coated. The processors might be further configured to image an object which includes the substrate surface to be coated to acquire substrate imaging data, segment a plurality of original surfaces of the object from each other in the substrate imaging data, the original surfaces including the substrate surface, apply visually differentiated indications to the original surfaces in the substrate imaging data to generate enhanced substrate imaging data, and display a visual representation of the enhanced substrate imaging data.

The processors might adjust one or more of filters, masks, and layers that get applied to the substrate imaging data to hone in on a particular visual indication that is acceptable to a user. The processors might perform real-time adjustment of the one or more of filters, masks, and layers based at least in part on the one or more light sources. The processors might select and apply a gloss type to the substrate imaging data. The processors might process the substrate imaging data to calculate an area of the original surfaces of the object to be painted. The processors might image the substrate surface to be coated to acquire substrate imaging data, enhance a spectral response differentiation in the substrate imaging data to generate enhanced substrate imaging data, and process the enhanced substrate imaging data to determine whether one or more surface preparation operations are to be performed on the substrate surface. The enhanced image data might be used with coatings-related metadata for alerting and notification operations associated with out-of-tolerance conditions.

An example processor-implemented system for determining mix ratios includes one or more processors that acquire original image data from a coating material applied to a substrate surface. A spectral response differentiation is enhanced in the original image data to generate enhanced image data. Spectral response data associated with one or more light sources is acquired based at least in part on the enhanced image data. Mix ratio data of the coating material is acquired. An interrelationship is determined between the spectral response data associated with the one or more light sources and the mix ratio data of the coating material. One or more non-transitory machine-readable storage media store the original image data, the enhanced image data, the spectral response data, the mix ratio data, and a data structure for the interrelationship between the spectral response data associated with the one or more light sources and the mix ratio data of the coating material.

The spectral response differentiation may be enhanced based at least in part on color pigmentation of one or more components in the coating material. The spectral response differentiation may be enhanced based on metamers associated with one or more components in the coating material. The spectral response differentiation may be enhanced based at least in part on one or more spectral fingerprints of one or more non-visible components in the coating material. The processors may apply one or more image processing filters to generate the enhanced image data. The one or more image processing filters include one or more infrared bandwidth spectral optical filters. The one or more image processing filters include one or more ultra-violet bandwidth spectral optical filters. The spectral response data may include infrared bandwidth spectral responses associated with one or more non-visible components in the coating material. The spectral response data might include ultra-violet bandwidth spectral responses associated with one or more non-visible components in the coating material. The one or more processors may determine a formula associated with the interrelationship between the spectral response data associated with the one or more light sources and the mix ratio data of the coating material, and calculate the data structure for the interrelationship using the formula. The one or more processors may determine the formula using a linear regression method based at least in part on the spectral response data associated with the one or more light sources and the mix ratio data of the coating material. The formula might indicate that a mix ratio is a function of a spectral response, given the substrate surface and the one or more light sources. The processors might perform a spectral response measurement to acquire the spectral response data, perform a mix-ratio measurement to acquire the mix ratio data, and generate the data structure for the interrelationship between the spectral response data associated with the one or more light sources and the mix ratio data of the coating material, wherein the data structure includes one or more spectral response fields for storing the spectral response data and one or more mix-ratio fields for storing the mix ratio data, the spectral response data being mapped to the mix ratio data in the data structure. The processors might acquire test image data from the coating material applied to a test surface, enhance a spectral response differentiation in the test image data to generate enhanced test image data, determine test spectral response data based at least in part on the enhanced test image data, process a database query that operates over the spectral response fields and the mix-ratio fields based at least in part on the test spectral response data, and output a test mix ratio of the coating material according to the database query. The processors might acquire the original image data in real-time. The processors might perform one or more image processing operations to generate the enhanced image data in real-time, wherein the enhanced image data is used with coatings-related metadata for alerting and notification operations associated with out-of-tolerance conditions. The one or more image processing operations include one or more of color mapping, contrast manipulation, histogram equalization, brightness control, masking using spatial convolution kernels, filtering, compression, thresholding, convolution, correlation, segmentation, multi-spectral band ratioing, intensity-hue-saturation (IHS) transformation, spatial convolution filtering, directional filtering, image subtraction, image magnification, layering, focusing, de-focusing, mirroring, and spatial alignment. The processors might scan a code to identify the coating material and select one or more predetermined image processing operations and one or more predetermined parameters associated with the coating material for generating the enhanced image data. The one or more predetermined parameters might be associated with the coating material include one or more calibration factors. The processors might perform a calibration process to correlate one or more substrate surfaces, one or more coating materials, or one or more light sources to a standard.

An example processor-implemented system includes one or more processors configured to acquire original image data from a self-inspecting coating material applied to a substrate surface, enhance a spectral response differentiation in the original image data to generate enhanced image data, acquire inherent spectral response data (or designed spectral response data) associated with one or more light sources based at least in part on the enhanced image data, quantify an inherent spectral response of the coating material, and determine an interrelationship between the inherent spectral response data (or designed spectral response data) associated with the one or more light sources and the quantified inherent spectral response of the coating material. One or more non-transitory machine-readable storage media might store the original image data, the enhanced image data and the inherent spectral response data (or designed spectral response data), and a data structure for the interrelationship between the inherent spectral response data associated with the one or more light sources and the quantified inherent spectral response of the coating material. The inherent response might corresponds to a thickness of the coating material, or to a mix ratio of the coating material, or to chromism associated with the coating material.

These and other advantages and novel features of the present invention, as well as details of illustrated embodiments thereof, will be more fully understood from the following description and drawings.

DETAILED DESCRIPTION

Certain embodiments of the systems and methods described herein provide real-time enhanced digital imaging for the prediction, application, and inspection of coatings. Other embodiments of the systems and methods described herein provide real-time enhanced digital imaging for applications to law enforcement, security, etc. The embodiments of the invention as described herein can be applied in real-time or saved for later review and processing.

Various embodiments of real-time digital imaging and processing (RTDIP) devices and methods described herein provide various combinations of image processing techniques to accomplish various application functions, inspection functions, prediction functions, and other security and law enforcement functions described herein. Various types of image processing techniques may include color mapping, contrast manipulation (enhancement, stretching, linear, non-linear), histogram equalization, brightness control, masking using spatial convolution kernels, filtering (spatial, spectral, temporal, edge enhancement, sharpening, smoothing), compression, thresholding, convolution, correlation, segmentation, multi-spectral band ratioing, intensity-hue-saturation (IHS) transformation, spatial convolution filtering (e.g., directional filtering), image subtraction, image magnification, layering, focusing, de-focusing, mirroring, and spatial alignment. Other image processing techniques may be possible as well. Such image processing techniques may be implemented in software, hardware, or combinations thereof in accordance with various embodiments, and may be tuned, calibrated, and preset for particular modes of operation.

Application Mode

Figure 1:
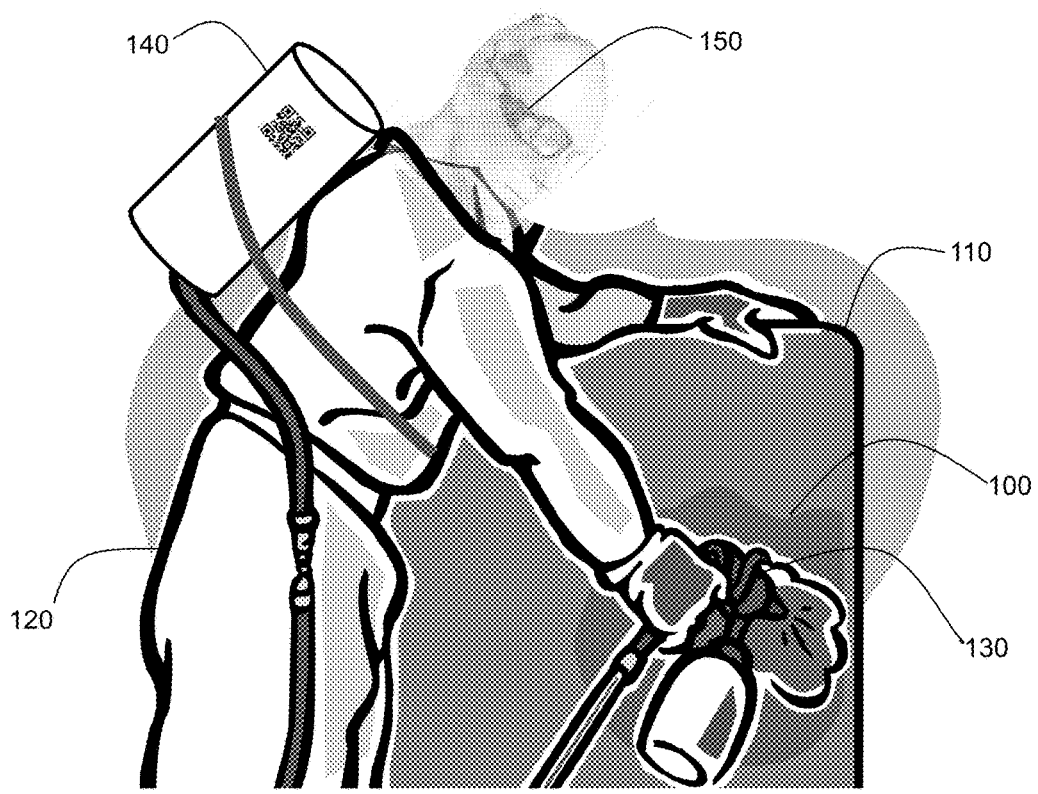
FIG. 1 illustrates an example embodiment of a method of monitoring a thickness of a coating on a substrate while applying the coating to the substrate.

FIG. 1 illustrates an example embodiment of a method of monitoring a thickness of a coating 100 on a surface of a substrate 110 while applying the coating to the surface of the substrate. As shown in FIG. 1, a user 120 is using a spray gun 130 to apply the coating 100 to the surface of the substrate 110. Other methods of applying the coating are possible in other embodiments (e.g., using a paint brush that is dipped into a container containing the coating). In some applications, the resultant thickness of the coating that is applied to the substrate may be critical, or at least important, to provide proper protection.

Referring to FIG. 1, the spray gun 130 is operatively connected to a coating container 140 that contains a self-inspecting coating (SIC). In accordance with an embodiment, a self-inspecting coating includes a coating (e.g. a liquid coating) that provides a visual indication (e.g., visible or invisible to naked eyes) of thickness. As an example, the visual indication of the coating properties may be provided as the coating is applied or after the coating is applied. For example, a color of the coating can change as the applied thickness changes, in accordance with an embodiment. In this manner, a user is able to perform a certain level of self-inspecting as the user applies the coating. That is, the user may visually observe the color of the coating as it is applied to the substrate in an attempt to determine if the thickness is correct.

The ability of a human user to observe the color of a coating (or variations in the color of the coating across a substrate) with the naked eye is limited by the actual variation in color that occurs as the thickness of the coating changes and by the visual acuity and discernment of the user.

However, in the embodiment of FIG. 1, the user is wearing a real-time digital imaging and processing (RTDIP) device 150 (e.g., based on Google Glass™) to aid in discerning the colors (and, therefore, the thickness) of the applied coating as the coating is applied by the user in real-time.

Figure 2:
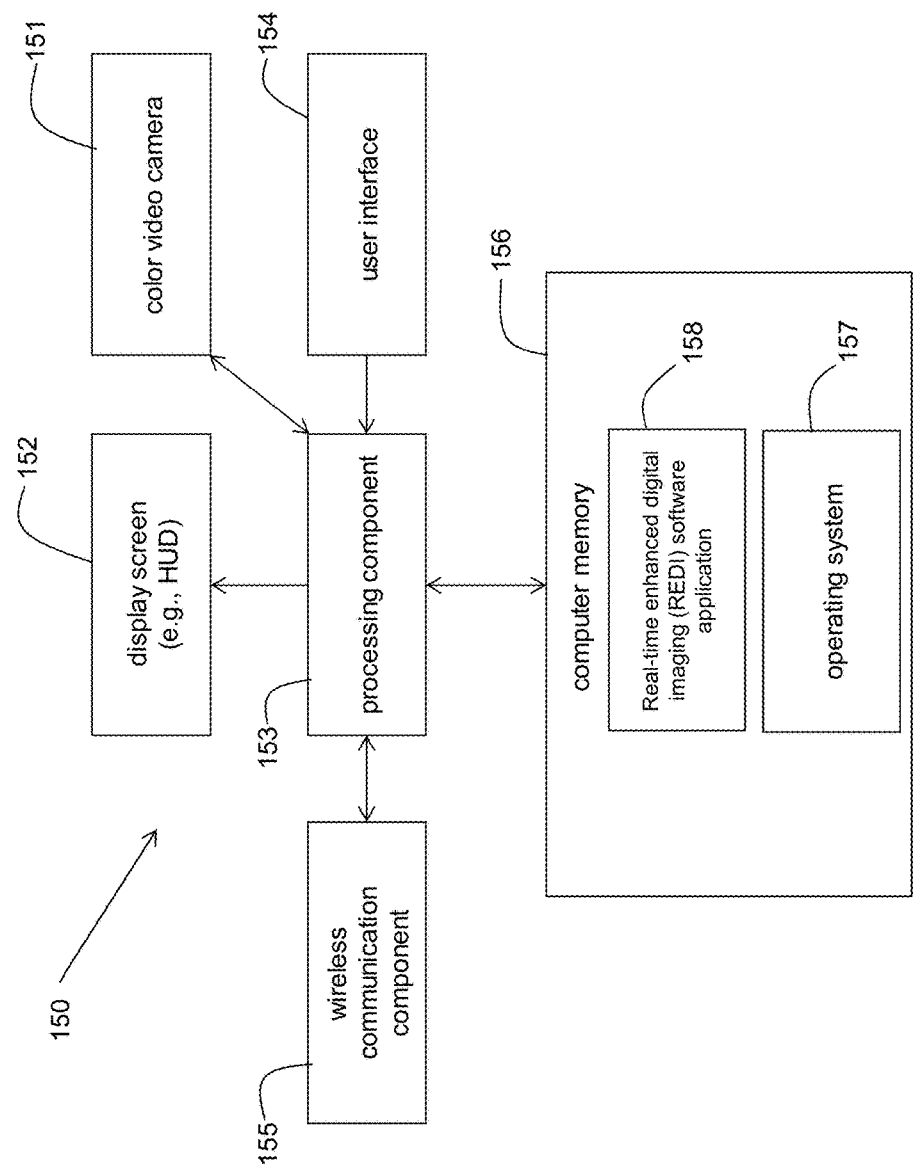
FIG. 2 illustrates a system block diagram of an example embodiment of the real-time digital imaging and processing (RTDIP) device.

FIG. 2 illustrates a system block diagram of an example embodiment of the real-time digital imaging and processing (RTDIP) device 150. In accordance with an embodiment, the RTDIP device 150 includes a color video camera 151, a display screen (e.g., a heads-up-display (HUD)) 152, a processing component 153, a user interface 154, a wireless communication component 155, computer memory 156, and software encoded instructions stored in the computer memory 156 and configured to execute on the processing component 153. The software encoded instructions are configured (i.e., programmed) to provide the various functionality (e.g., enhanced color discernment and quantification of coating thickness) described herein when executed on the processing component 153 in cooperative operation with the color video camera 151, the display screen 152, the user interface 154, the wireless communication component 155, and the computer memory 156 ("computer memory" may refer to a physical device or other storage mechanisms such as websites or cloud storage). In accordance with an embodiment, the software encoded instructions may be in the form of at least an operating system 157 and a real-time enhanced digital imaging (REDI) software application 158 stored in the computer memory 156.

The functionality provided by the REDI software application 158 can be configured to be fairly comprehensive. For example, the REDI software application 158 can perform various image enhancement operations, such as brightness and contrast adjustment, display adjustment, color mapping, channel overlay, noise suppression, segmentation, etc. In some embodiments, the REDI software application 158 performs the image enhancement operations automatically without user input. In certain embodiments, a user interface is provided to receive user inputs for image enhancement, and the REDI software application 158 performs the image enhancement operations in response to the user inputs.

In accordance with alternative embodiments, the processing component 153 may be a digital signal processor (DSP) or some other hardware-oriented logic circuitry. In accordance an embodiment, the RTDIP device is able to record digital imaging data (video or still images) for subsequent playback (e.g., recording of acquired imaging data and enhanced imaging data for comparison). The user interface 154 may include, for example, a touch-screen display, a keyboard, a mouse, voice-activated capability, or some other technology.

In accordance with certain embodiments, the software encoded instructions are configured (i.e., programmed) to determine an interrelationship between spectral responses and coating thicknesses. For example, an original image is taken from a self-inspecting material applied to a substrate surface. The REDI software application 158 performs one or more image enhancement operations to generate an enhanced image. A spectral response with respect to a light source is determined from the enhanced image. A measurement of the coating thickness is performed, and the measured coating thickness is stored together with the spectral response in a data structure in the computer memory 156. The above-noted process continues to collect a number of data points of spectral responses and coating thicknesses. The software encoded instructions are configured (i.e., programmed) to determine a formula indicating the interrelationship between spectral responses and coating thicknesses based on the collected data points, e.g., using a linear regression method. For example, the formula indicates that a coating thickness is a function of a spectral response, given a particular substrate surface and a particular light source. In accordance with an embodiment, the REDI software application 158 may then be configured to calculate a coating thickness using the formula based on a spectral response obtained from an enhanced image.

In accordance with some embodiments, the collected data points of spectral responses and coating thicknesses may be stored into a database in the computer memory 156 which maps spectral responses to coating thicknesses. The REDI software application 158 then performs a database inquiry to read out a coating thickness from the database corresponding to a spectral response of the self-inspecting coating material obtained from the enhanced image.

In accordance with some embodiments, a spectral response obtained from an enhanced image may include a recognizable spectral fingerprint of a non-visible component. When the non-visible component is mixed into a coating material, the coating material retains a same visible color, and the invisible spectral response associated with the spectral fingerprint of the non-visible component may be enhanced and quantified using the REDI technology and correlated to the film thickness.

Figure 3:
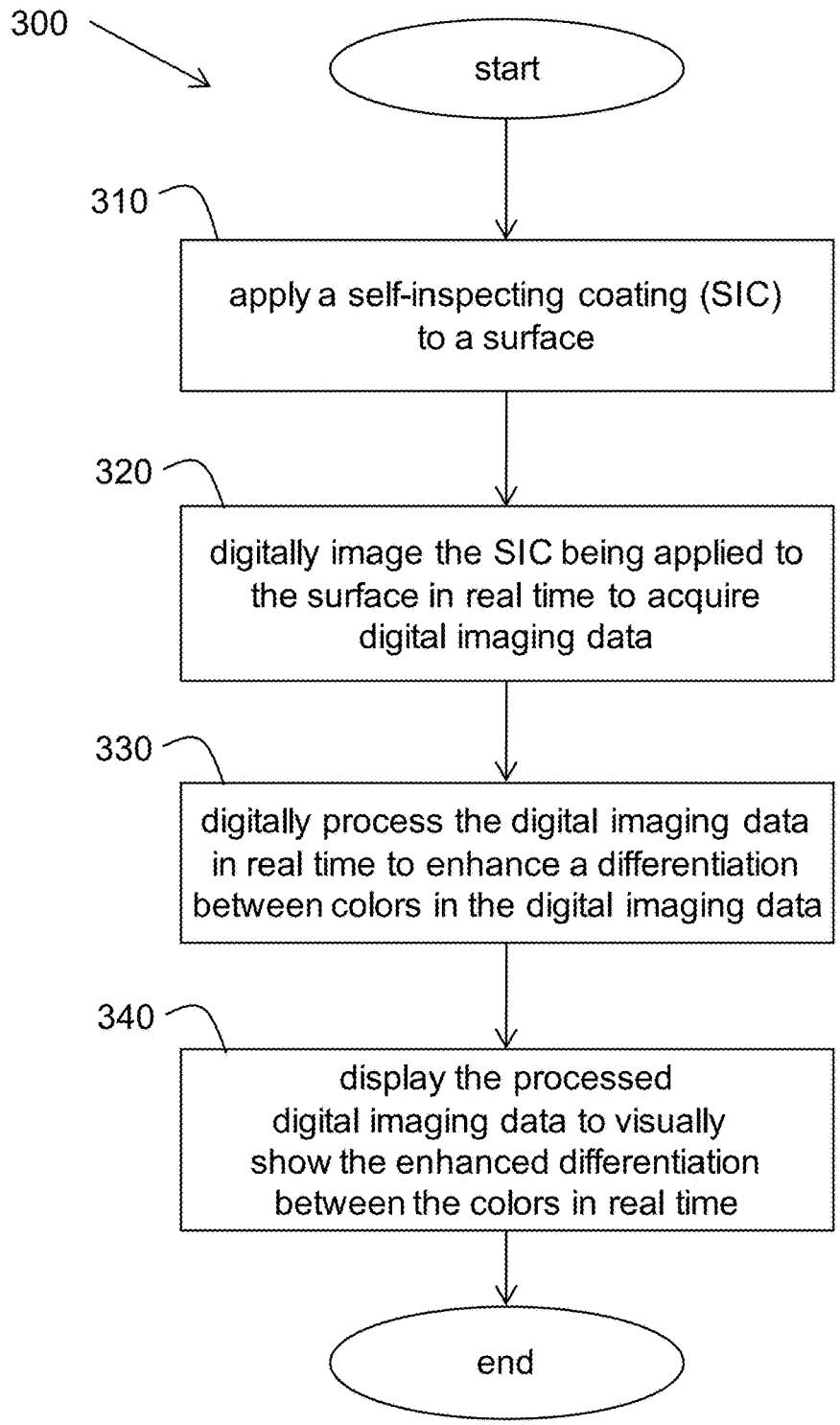
FIG. 3 is a flowchart of an example embodiment of the method of FIG. 1 of monitoring a thickness of a coating while applying the coating to a substrate using the real-time digital imaging and processing device of FIG. 2.

FIG. 3 is a flowchart of an example embodiment of the method 300 of FIG. 1 of monitoring a thickness of a coating while applying the coating to a surface or substrate using the real-time digital imaging and processing device 150 of FIG. 2. In step 310 of the method, apply a self-inspecting coating (SIC) to a surface. As an example of an SIC, a Fast Clad epoxy primer available from Sherwin Williams can be used as follows. A Fast Clad epoxy primer is a high solids epoxy amine coating. The pigments are removed from the primer, and a yellow pigment with low opacity properties is added to the primer. The primer with the low-opacity yellow pigment is relatively transparent when initially applied to a substrate, but as the coating becomes thicker, the primer with the pigment becomes more opaque.

It should be understood that different colored pigments can be used depending upon the application at hand. For example, a yellow pigment can be used in situations where the substrate is black. This provides a good color contrast, whereas a black pigment in the coating is not effective if the underlying substrate is black. Additionally, the coating may be applied to the surface in any of a number of different ways including using a spray gun or a paint brush.

In step 320, one or more digital images of the SIC being applied to the surface in real-time are generated to acquire digital imaging data. For example, a user wearing the RTDIP device 150 can acquire real-time color digital video imaging data with the color video camera 151. In accordance with an embodiment, the acquired digital image data corresponds to one or more real-time digital images for the SIC which is applied to the surface. A digital image may be two or three dimensional and include one or more color channels. For example, a digital image includes a two dimensional grid of pixels, where each pixel is associated with a set of coordinates and an intensity value (e.g., an integer between 0 and a maximum intensity value). Higher intensity values indicate lighter pixels, and lower intensity values indicate darker pixels.

In step 330, the digital imaging data is digitally processed in real-time to enhance a differentiation between colors in the digital imaging data. For example, the REDI software application 158 running on the processing component 153 can digitally process the real-time color digital video imaging data by performing various types of image processing and filtering techniques to generate processed real-time color digital video imaging data. The color differences can be made to be stark to a human user. For example, the color difference can be explained in different ways, such as through a color space where hue is expressed as an angle within a cylindrical color space. In such a color space, a color difference that would be stark to a human user could be a 45 degree difference within the cylindrical coordinate system. In other words, colors that are separated by a certain amount of degrees (e.g., 45 degrees or more in certain embodiment) in the cylindrical color coordinate color space can provide a satisfactory color difference. However, it should be understood that a stark color contrast may also be achieved with less than 45 degrees.

In accordance with some embodiments, the REDI software application 158 performs brightness and contrast adjustment of one or more digital images associated with the acquired digital image data. Specifically, the REDI software application 158 selects a number of pixels in a digital image and changes the intensity values of the selected pixels according to a predetermined algorithm. As an example, the REDI software application 158 maps intensity values of a number of pixels of a digital image to display values (e.g., by a linear function). In accordance with certain embodiments, the REDI software application 158 performs display adjustments of the one or more digital images associated with the acquired digital image data. For example, pixels with very high intensities and/or very low intensities of a digital image are made visible, the REDI software application 158 performs non-linear display adjustments (e.g., Gamma correction, normalization, contrast stretching, histogram equalization, etc.) so that low intensity values become bigger without saturating high intensity values.

In accordance with an embodiment, the REDI software application 158 performs color mapping of one or more digital images associated with the acquired digital image data. Specifically, the REDI software application 158 maps the intensity values of a number of pixels of a digital image to colors (e.g., using one or more lookup tables).

For example, an intensity value may be mapped to a color which includes three components corresponding to basic colors, red, green and blue. Different component values of the color indicate different basic color shades. To enhance color differentiation, the REDI software application 158 may select a number of pixels in the digital image and change the color values mapped to the selected pixels, so that the basic color shades of the selected pixels are adjusted. In some embodiments, the REDI software application 158 performs the color enhancement operations automatically without user input. In certain embodiments, a user interface is provided to receive user inputs for color enhancement, and the REDI software application 158 performs the color enhancement operations in response to the user inputs. In accordance with an embodiment, the REDI software application 158 performs channel overlay of one or more digital images associated with the acquired digital image data. Specifically, the REDI software application 158 creates an overlay of different color channels of a digital image, adjusts the display of each channel and transfers the settings from one overlay to another to allow a visual comparison.

In accordance with an embodiment, the REDI software application 158 performs noise suppression of one or more digital images associated with the acquired digital image data. For example, the REDI software application 158 may apply one or more convolution filters (e.g., a mean filter, a Gaussian blur filter, an edge enhancing filter, etc.) to reduce the noises in a digital image. In another example, the REDI software application 158 may apply one or more rank filters for noise suppression, e.g., replacing the intensity values of a number of pixels with an intensity value of a specifically selected pixel. In accordance with an embodiment, the REDI software application 158 performs segmentation of one or more digital images associated with the acquired digital image data to separate one or more objects from the background and separate the objects from each other. For example, a threshold range is selected, and all pixels of an object have intensity values within the threshold range.

In step 340, the processed digital imaging data is displayed to visually show the enhanced differentiation between the colors in real-time. For example, the processing component 153 can format the processed real-time color digital video imaging data and send it to the display screen 152 for display. In accordance with an embodiment, the display screen 152 is a HUD positioned in front of an eye of the user.

Figure 4:
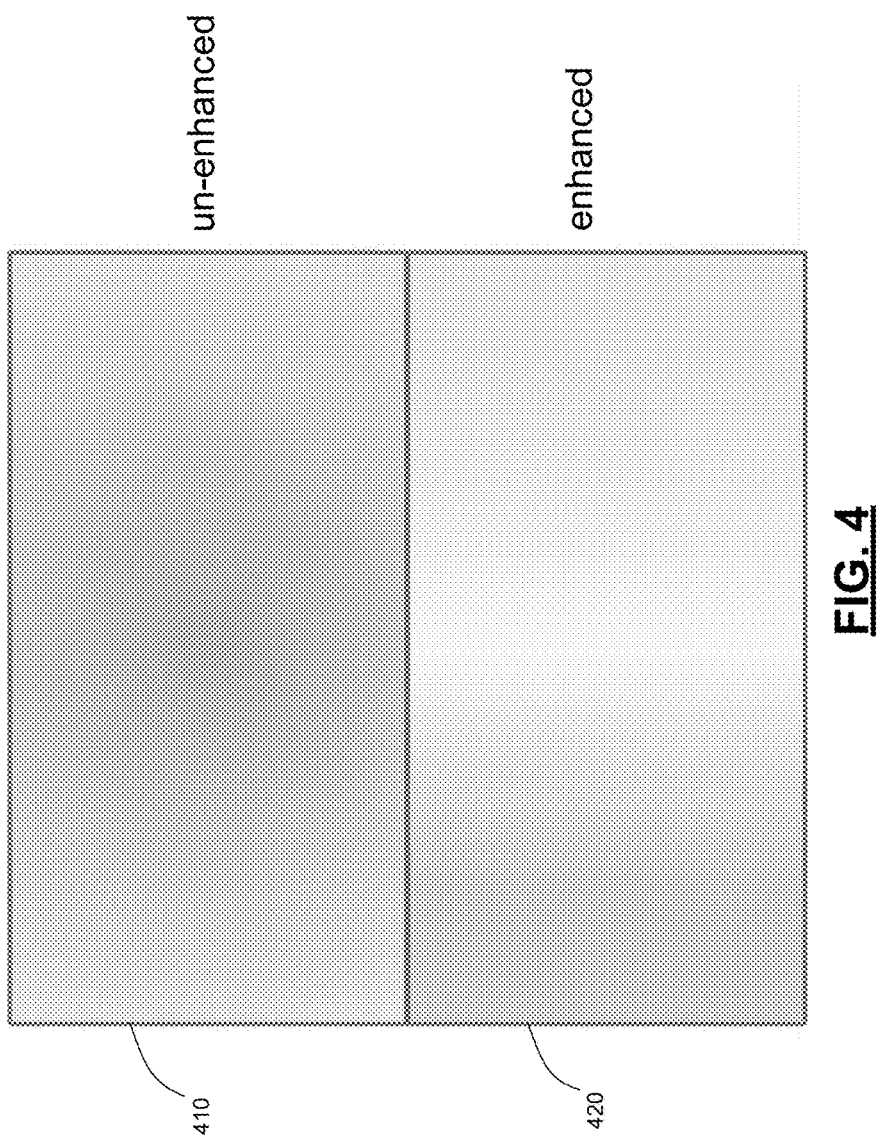
FIG. 4 shows an example embodiment of a first image of a coating on a substrate before image enhancement as well as an example embodiment of a second image of the coating on the substrate after image enhancement.

FIG. 4 shows an example embodiment of a first image 410 of a coating on a substrate before image enhancement as well as an example embodiment of a second image 420 of the coating on the substrate after image enhancement. The first image 410 is representative of a single image of the real-time color digital video imaging data acquired by the color video camera 151 of the RTDIP device 150. The colors in the image 410 appear relatively uniform but slightly darker near the middle portion of the image 410. When viewing such an unprocessed image, it would be difficult (if not impossible) for the user to discern any significant coating thickness variation across the substrate.

The second image 420 is representative of the single image of the real-time color digital video imaging data acquired by the color video camera 151 after the image 410 has been processed by the REDI software application 158 running on the processing component 153. As can be seen in the second image 420, a larger variation in colors appears in the second image, providing a much better indication to the user of how the thickness of the coating on the substrate varies. The user can view this processed information on the display screen 152 and use this information to attempt to smooth out or apply a more uniform coating to the substrate. It should be noted at this point that, even though the images shown in the figures herein are represented in gray-scale colors, real-world applications can make use of the full spectrum of visible colors as digitally represented, for example, by combinations of red (R), green (G), and blue (B) pixels.

Figure 5:
FIG. 5 illustrates several example embodiments of real-time digital imaging and processing (RTDIP) devices that may be used to perform the method of FIG. 1 and FIG. 3.

FIG. 5 illustrates several example embodiments of real-time digital imaging and processing (RTDIP) devices that may be used to perform the method of FIG. 1 and FIG. 3. One embodiment is the wearable RTDIP device 150 already discussed herein. Another embodiment is an RTDIP device 510 in the form of a laptop computer. A further embodiment is an RTDIP device 520 in the form of a mobile telephone (e.g., a "smart phone"). Still another embodiment is an RTDIP device 530 in the form of a tablet computer. Yet another embodiment is an RTDIP device 540 having handles 541, a light source 542, and a polarized camera lens 543. The light source 542 may provide illumination that results in the acquisition of more consistent imagery. Furthermore, the polarized lens 543 may serve to reduce or eliminate unwanted reflections or glare in the acquired imagery. Other devices, other than a polarized lens, may be used to reduce or eliminate unwanted reflections or glare in the acquired imagery, in accordance with various other embodiments. Each of these various devices may have the components illustrated in FIG. 2, but are each provided in a different form factor and configuration. Certain form factors and configurations may be more appropriate for certain applications. Other form factors and configurations are possible as well, in accordance with other embodiments.

Figure 6:
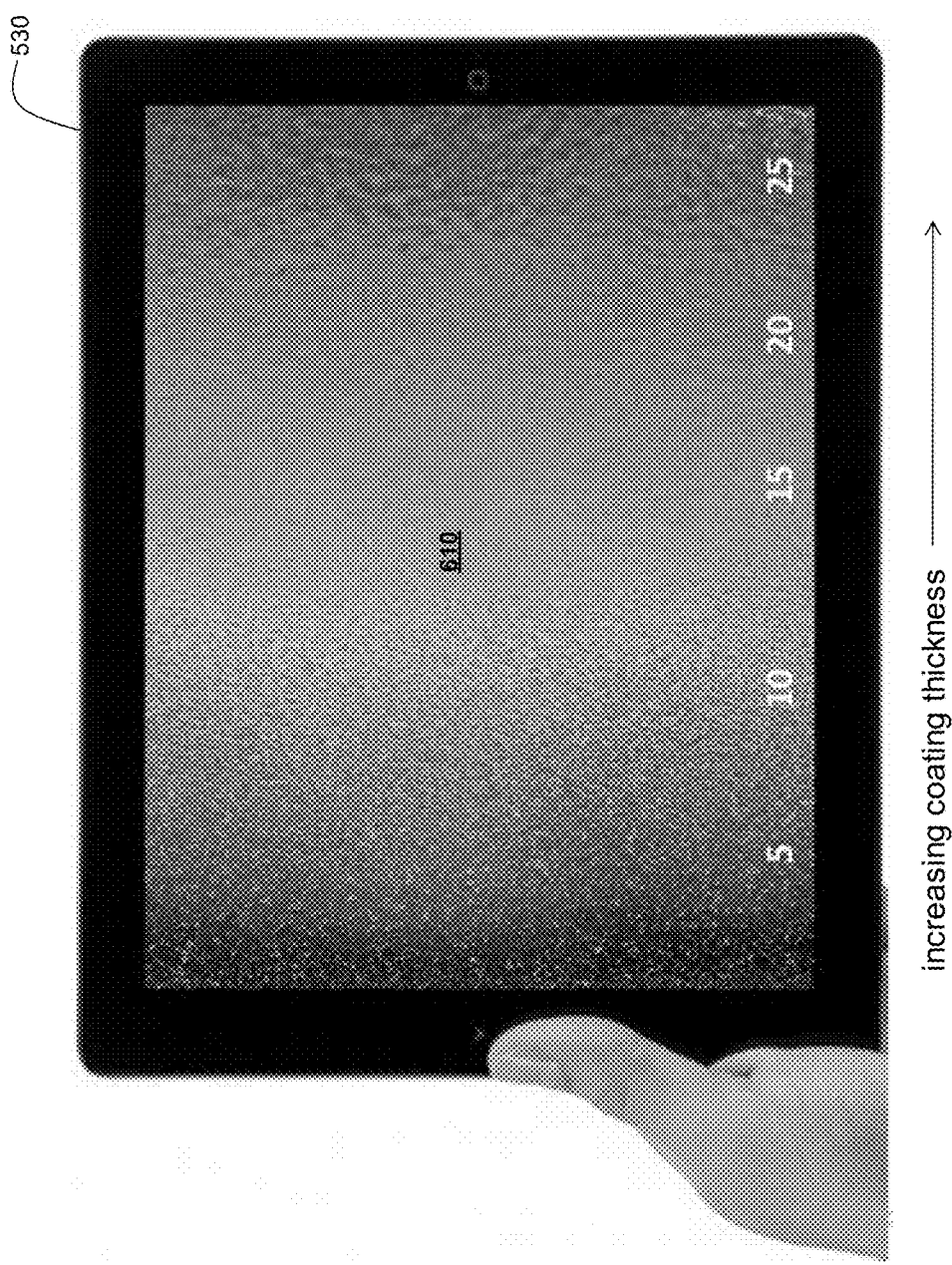
FIG. 6 illustrates an example embodiment of an acquired image of a coating on a substrate after image enhancement and quantization of coating thickness.

FIG. 6 illustrates an example embodiment of an acquired image 610 of a coating on a substrate after image enhancement and quantization of coating thickness. The image was acquired and displayed using the RTDIP device 530 in the form of a tablet computer. The thickness of the coating varies from left to right (from thinner to thicker) as indicated by the different colors and by the numeric values (e.g., 5, 10, 15, 20, 25) displayed at the bottom of the displayed image 610. Again, it is noted that, even though the image shown in FIG. 6 is represented in gray-scale colors, real-world applications can make use of the full spectrum of visible colors as digitally represented, for example, by combinations of red (R), green (G), and blue (B) pixels.

In accordance with an embodiment, the REDI software application 158 is calibrated such that the resulting colors may be converted to numeric values (e.g., 5, 10, 15, 20, 25) being representative of the estimated thickness (e.g., in millimeters) of the applied coating (quantitative metering). Each different type of self-inspecting coating (SIC) may have its own calibration settings to correctly convert the colors of enhanced image data to numeric thickness values.

Figure 7:
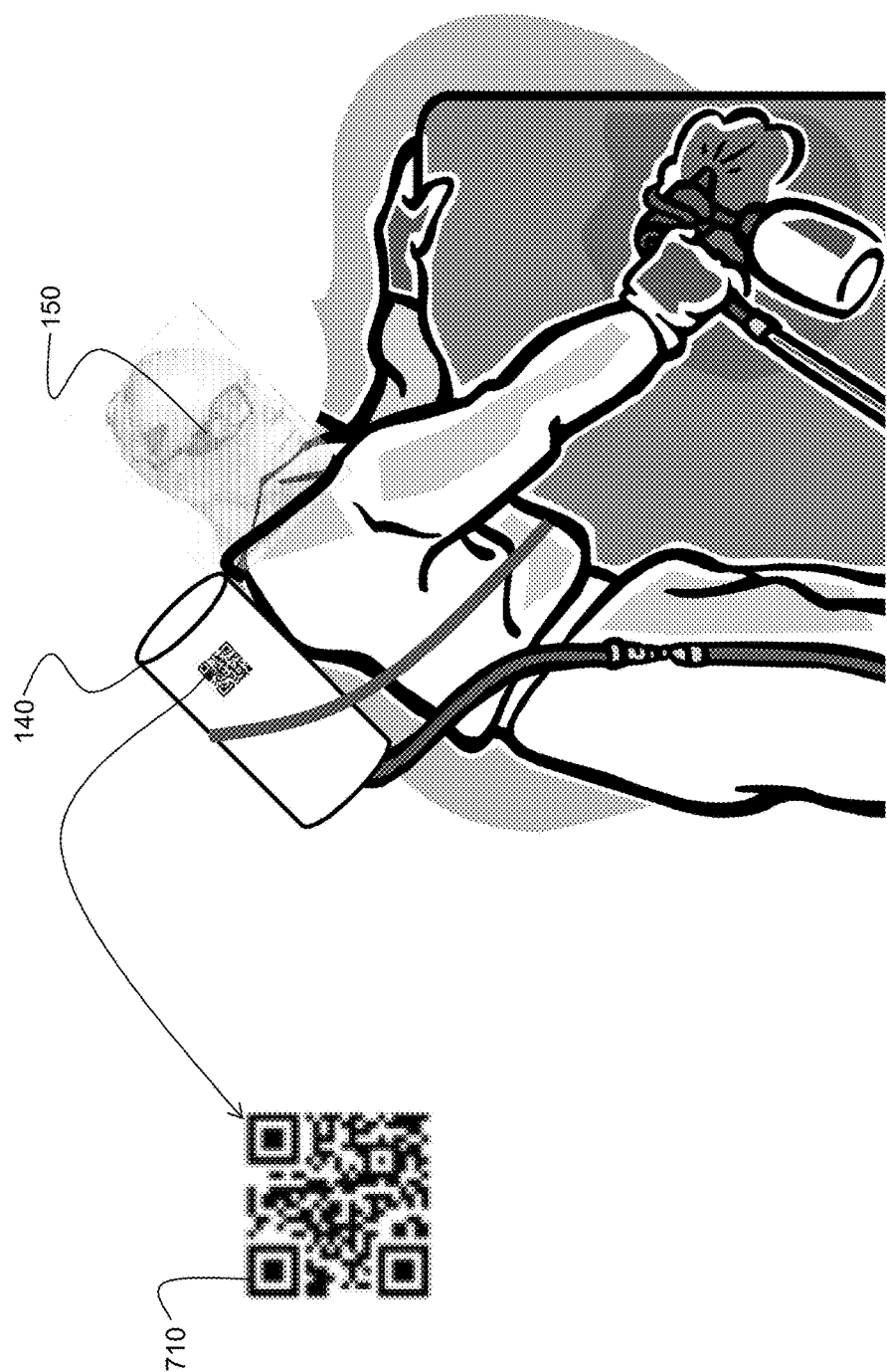
FIG. 7 illustrates an example embodiment of a code on a coating container that may be scanned and used to select presets of a real-time digital imaging and processing (RTDIP) device.

FIG. 7 illustrates an example embodiment of a machine-readable code 710 on a coating container 140 that may be scanned and used to select presets of a real-time digital imaging and processing (RTDIP) device. In accordance with an embodiment, the code 710 may be a Quick Response (QR) code (or some other type of bar code) and the RTDIP device 150 may be configured to acquire an image of the code 710 using the video camera 151, and decode the image of the code 710 using the REDI software application 158 running on the processing component 153. Alternatively, the RTDIP device 150 may include a separate optical scanner (e.g., a laser scanner) to read the code.

The code 710 identifies the type of SIC in the container 140. Once the code 710 has been de-coded by the RTDIP device 150 to identify the coating, the RTDIP device 150 can select the image processing operations, parameters, and calibration factors that are associated with the identified coating (i.e., select coating presets). In accordance with an embodiment, the coating presets associated with the identified coating have been optimized such that processing of acquired real-time color digital video imaging data using the coating presets provides good color discernment and/or quantization of coating thickness to the user when the enhanced image data is displayed. Optimization or calibration of the coating presets may take into account the substrate type, the coating type, the lighting conditions, and additional variables (e.g., lenses). Calibration is discussed later herein in detail.

As an example, referring to FIG. 1 and FIG. 2, the REDI software application 158 of the RTDIP device 150 may employ a combination of spectral filtering techniques, contrast enhancement techniques, histogram equalization techniques, and color mapping techniques in a coating application mode. Such a combination allows the user to more readily and easily differentiate between the various colors (i.e., thicknesses) of the self-inspecting coating 100 being applied to the surface of the substrate 110, in accordance with an embodiment, and provides to the user a quantitative view of at least the minimum applied thickness and the maximum applied thickness.

Figure 8:
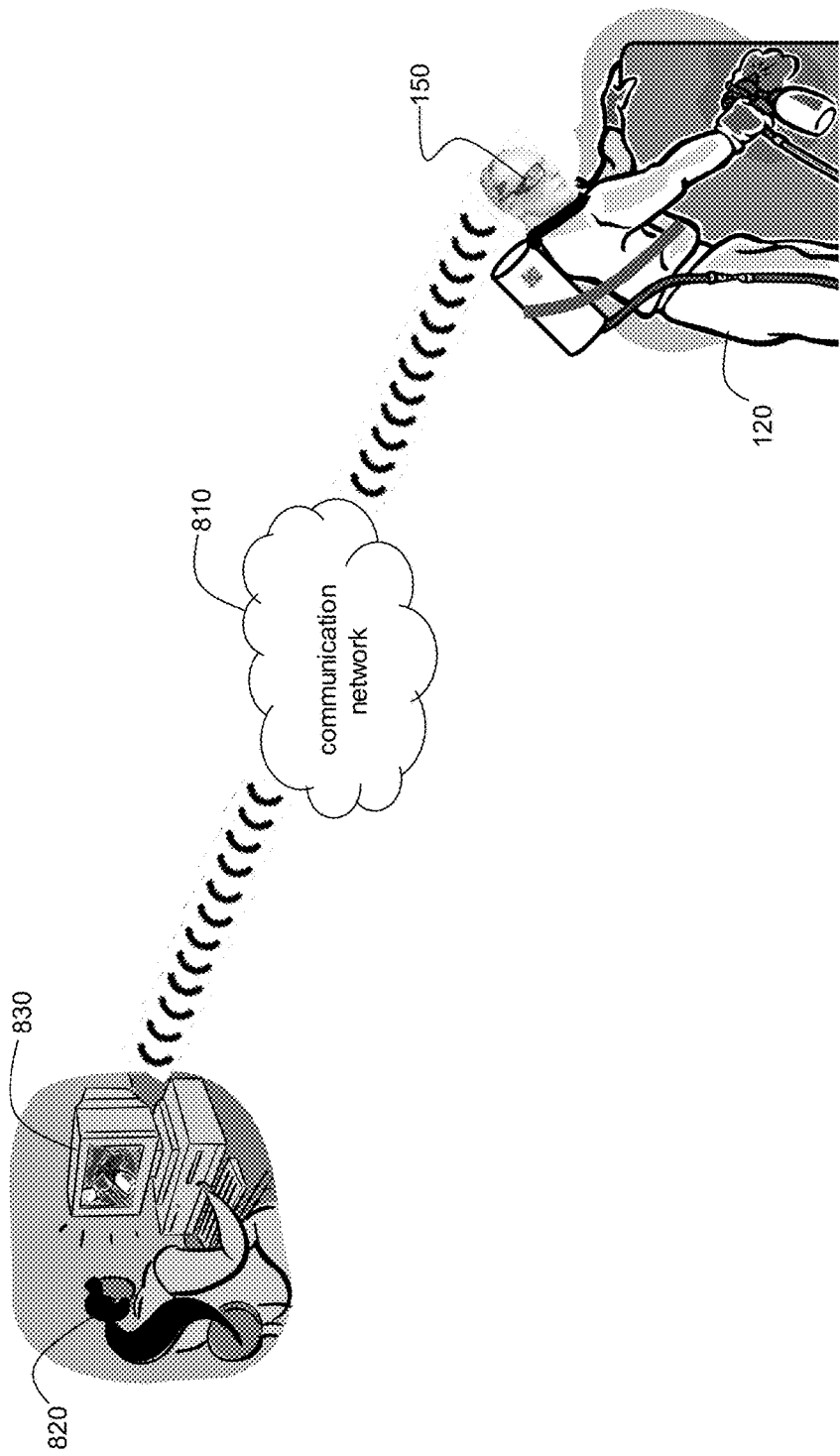
FIG. 8 illustrates an example embodiment of how an individual may remotely monitor the real-time application of a coating to a substrate using the method of FIG. 1 and FIG. 3.

FIG. 8 illustrates an example embodiment of how an individual may remotely monitor the real-time application of a coating to a substrate using the method of FIG. 1 and FIG. 3. As described previously herein, the RTDIP device may include a wireless communication component 155. The wireless communication component 155 may provide WiFi communication capability, 3G or LTE communication capability, or some other type of wireless communication capability through, for example, a communication network 810. The communication network 810 may be the internet, a cellular telephone network, a satellite communication network, some combination thereof, or some other type of communication network that is compatible with the wireless communication component 155.

Referring to FIG. 8, a supervisor 820 may be sitting at a computer 830 located remotely from where the user 120, who is applying a coating to a substrate, is located. The enhanced real-time color digital video imaging data generated by the RTDIP device 150 may be wirelessly transmitted from the RTDIP device 150, using the wireless communication component 155, to the remote computer 830 via the communication network 810. As a result, the supervisor 820 can monitor the performance of the user in real-time. If the user seems to be having trouble properly applying the coating (e.g., establishing a uniform coating at the specified thickness), the supervisor may take action to, for example, replace the user with a more qualified person. Other features that may be provided by an RTDIP device during an application process may include, for example, quality assurance functionality, volumetric quantification of the applied material (e.g., quantified thickness multiplied by the calculated dimensions and converted to gallons or some other unit of measure), and hole detection.

Inspection Mode

A substrate to be coated (e.g., a metal substrate) may have rust, salt, dirt or some other contaminating substance on the surface that needs to be cleaned off before applying a coating material. Even though a substrate surface may have been "cleaned" and appears to be clean to the naked eye, an unacceptable level of contamination may still exist on the substrate. Such an unacceptable level of contamination may cause a subsequently applied coating to improperly adhere to the surface, thus not properly protecting the surface. In general, an embodiment of an RTDIP device may be used to detect, identify, quantify, and record the state of a substrate surface before coating. The inspection mode may also be useful for analyzing variations in substrates, for example in porous substrates, or to analyze a pre-treatment that has been applied to a surface. Analysis of substrate variation or pre-treatment may or may not use color differences to show variations, but IR light may be used. In accordance with an embodiment, an RTDIP device may be used to image a surface of a substrate, enhance the image to more clearly discern any contaminating substances, and display the enhanced image to the user.

Figure 9:
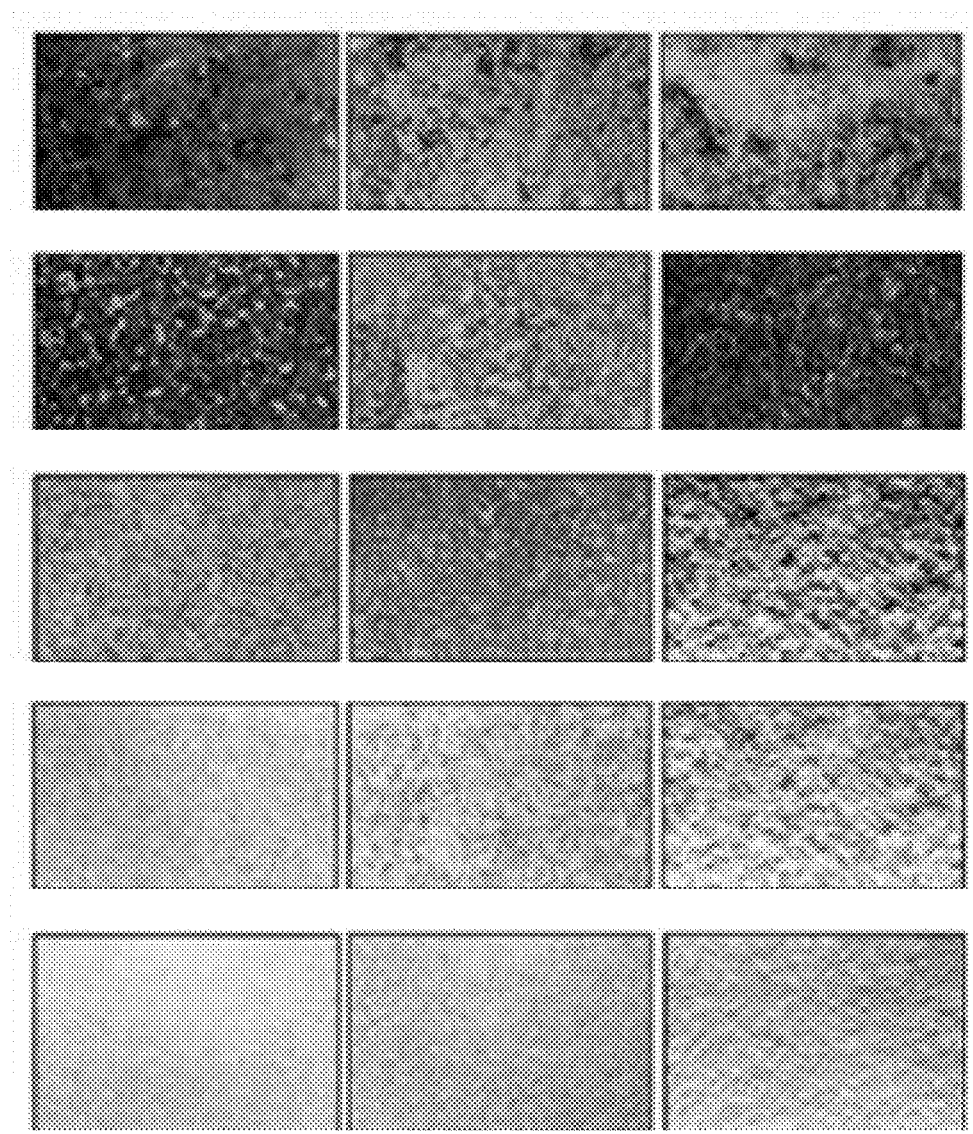
FIG. 9 illustrates a plurality of example embodiments of enhanced images (generated by an RTDIP device) of contaminated substrates before a coating is applied.

FIG. 9 illustrates at 902 a plurality of example embodiments of enhanced images (generated by an RTDIP device) of contaminated substrate surfaces before a coating is applied. Each enhanced image of FIG. 9 corresponds to a substrate surface having a different type and amount of contaminating substance (e.g., rust, salt, dirt). In some situations, salt may not be visible (in the visible light spectrum) and may require the application of an indicator to make the salt visible. However, multi-spectral techniques may be used to detect and visualize salts, that are otherwise not visible in the visible light spectrum, without the use of an applied indicator.

By using a properly configured RTDIP device to provide an enhanced image of a surface of a substrate before coating, a user may be able to clearly determine if the surface is clean enough to apply a coating. In accordance with an embodiment, image processing operations, parameters, and calibration factors (inspection presets) that are associated with a certain type of contamination (e.g., rust, salt, or dirt) may be selected via the user interface 154 of the RTDIP device. In accordance with an embodiment, the inspection presets associated with a particular type of contaminant are optimized such that processing of acquired real-time color digital video imaging data using the inspection presets provides good visual discernment between contaminated and un-contaminated portions of the substrate surface to the user when the enhanced image data is displayed.

In accordance with an embodiment, a type of contaminating substance may be identified by a user based on a displayed color of the contaminating substance in the enhanced image. For example, rust may be displayed as shades of orange and red. Salt may be displayed as shades of gray. Dirt may be displayed as shades of brown. A clean, un-contaminated surface may appear as white, for example. Furthermore, a level or grade of surface preparation may be quantifiable by comparing acquired digital imaging data to loaded comparative surface preparation standards.

Furthermore, a user may be able to discern not only the presence of a particular type of contaminating substance but also, at least qualitatively, an amount of the contaminating substance on any imaged portion of the surface based on color. Also, in accordance with an embodiment, quantitative amounts of a contaminating substance may be determined and numerically displayed to the user. For example, a percentage of the surface that is contaminated may be displayed to the user. This can be accomplished, at least in part, by dividing the number of pixels in an image showing a contaminating substance (e.g., the number of red and orange pixels indicating rust) by the total number of pixels in the image.

Figure 10:
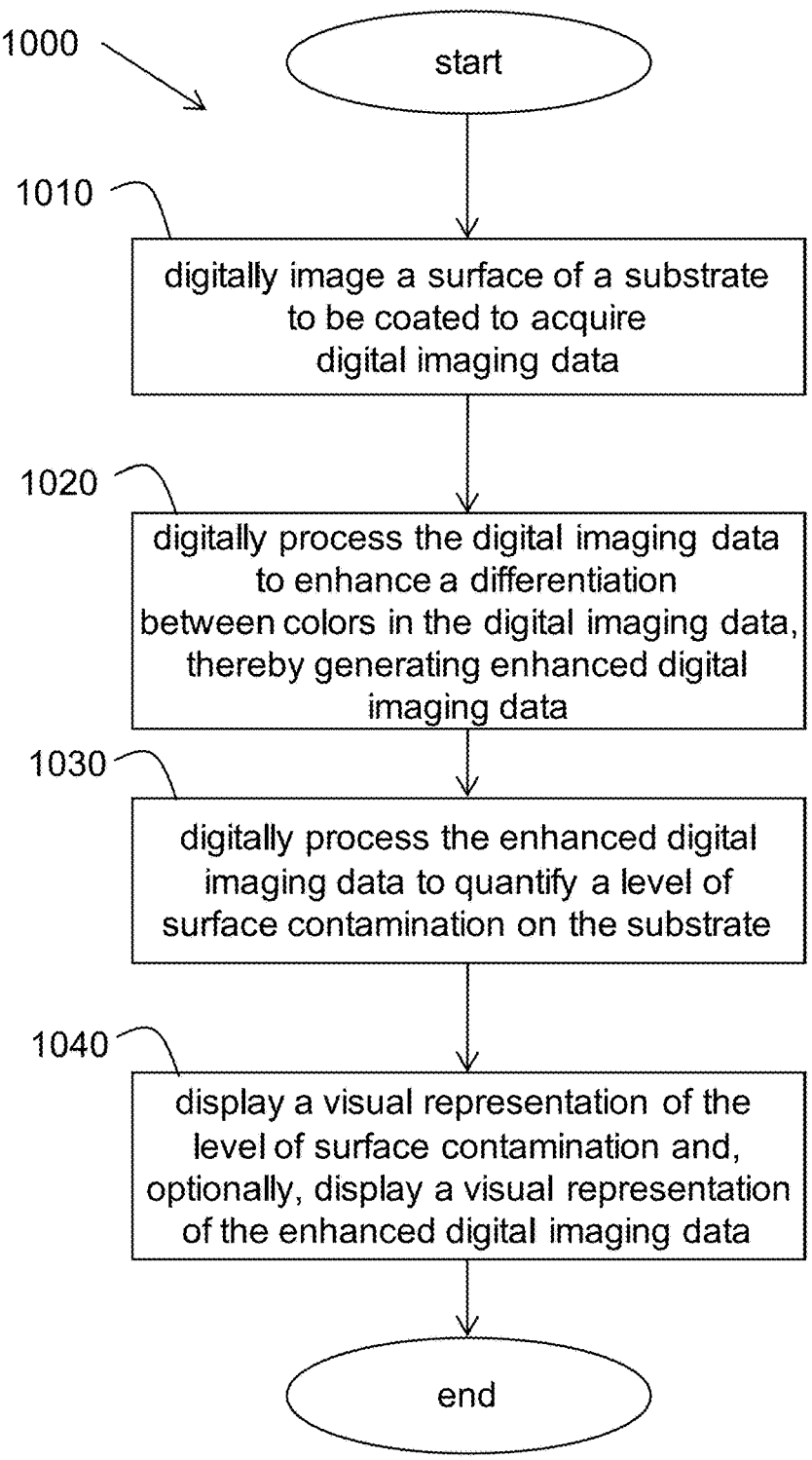
FIG. 10 is a flowchart of an example embodiment of an inspection method for quantifying a level of surface contamination on a substrate to be coated.

FIG. 10 is a flowchart of an example embodiment of an inspection method 1000 for identifying and/or quantifying characteristics of a substrate. Surface characteristics may include, but are not limited to levels of surface contamination on a substrate to be coated and surface variations. Again, the surface of the substrate may or may not be contaminated with, for example, rust, salt, or dirt. In step 1010 of the method, a surface of a substrate to be coated is digitally imaged to acquire digital imaging data. For example, a user may use a RTDIP device 530 in the form of a tablet computer to image the surface of the substrate. In accordance with an embodiment, capturing a single image may be sufficient. In step 1020, the digital imaging data is digitally processed to enhance a differentiation between colors in the digital imaging data, thereby generating enhanced digital imaging data (e.g., color differentiation could be 30 degrees or more). The differentiation in colors may help discern between contaminated and uncontaminated pixels in the enhanced digital imaging data, and help discern between the different types of contamination in the enhanced digital imaging data. Such discernments may not be readily apparent to a user when directly viewing the surface of the substrate with the naked eye.

In step 1030, the enhanced digital imaging data is digitally processed to quantify a level of surface contamination on the substrate. For example, a numeric value representing a percentage of the imaged surface that is contaminated may be generated. As another example, a standard deviation in pixel color across the enhanced digital imaging data may be computed and correlated to an amount of contamination on the imaged surface. In step 1040, a visual representation of the level of surface contamination is displayed and, optionally, a visual representation is displayed of the enhanced digital imaging data. For example, the level of surface contamination may be displayed to the user as a numeric value, and the visual representation of the enhanced digital imaging data may indicate to the user where on the surface of the substrate most of the contamination exists. Once the surface of the substrate to be coated is cleaned, the user may perform the inspection method 1000 again to verify that the level of contamination is within acceptable limits. Similar steps could be used to identify and quantify surface variations.

As an example, referring to FIG. 9 and FIG. 10, the REDI software application 158 of the RTDIP device 530 may employ a combination of edge enhancement techniques, compression techniques, and thresholding techniques in a pre-application inspection mode to allow the user to more readily and easily determine the presence and qualitative amount of contamination on the surface of a substrate to be coated, in accordance with an embodiment. Furthermore, the REDI software application 158 of the RTDIP device 530 may employ a combination of compression, masking, and correlation techniques in the pre-application inspection mode to allow the user to more accurately determine the type of contamination (e.g., rust, salt, dirt), in accordance with an embodiment.

An embodiment of an RTDIP device may be used for inspection after coating to enhance problem areas, such as point defects or micro-cracks, where the thickness of the coating is not correct or where the coating applied may have had an incorrect mix ratio.

Figure 11:
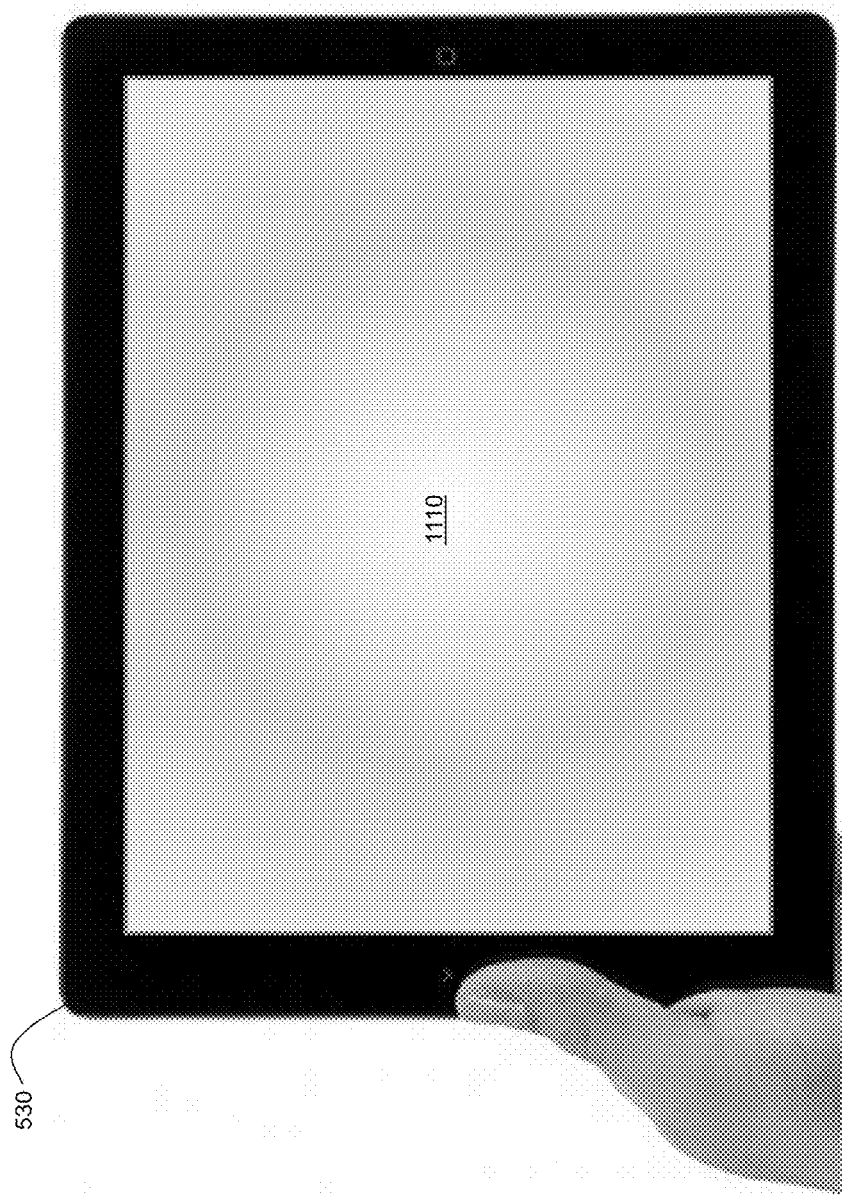
FIG. 11 illustrates an example embodiment of a real-time digital imaging and processing device being used to inspect a coated surface and displaying an enhanced image showing a coating thickness variation at a localized spot on the coated surface after the coating has been applied.

FIG. 11 illustrates an example embodiment of a real-time digital imaging and processing device 530 being used to inspect a coated surface and displaying an enhanced image 1110 showing a coating thickness variation at a localized spot on the coated surface after the coating has been applied (the applied coating may or may not be dried or cured at this point). As can be seen in the central portion of the image 1110, an apparently significant amount of variation in the coating thickness exists. An inspector can use the enhanced image as proof that the coating in the localized spot should be corrected (e.g., by re-application of the coating). In other embodiments, the RTDIP device could be used to inspect large areas to visualize areas having different thickness or to visualize areas of the coating that may have other problems, such as wrong component mix ratios.

As an example, referring to FIG. 11, the REDI software application 158 of the RTDIP device 530 may employ a combination of contrast enhancement techniques, histogram equalization techniques, color mapping techniques, and magnification techniques in a post-application inspection mode.

In general, an inspector can use the RTDIP device in an inspection mode for quality assurance purposes to detect, identify, quantify (metering), and record a resultant state of a coating after the coating is applied to a substrate. For example, a standard deviation in pixel color across the enhanced digital imaging data of the coating may be computed and correlated to an amount of deviation in coating thickness (or an amount of uniformity of coating thickness) over the substrate.

Figure 12:
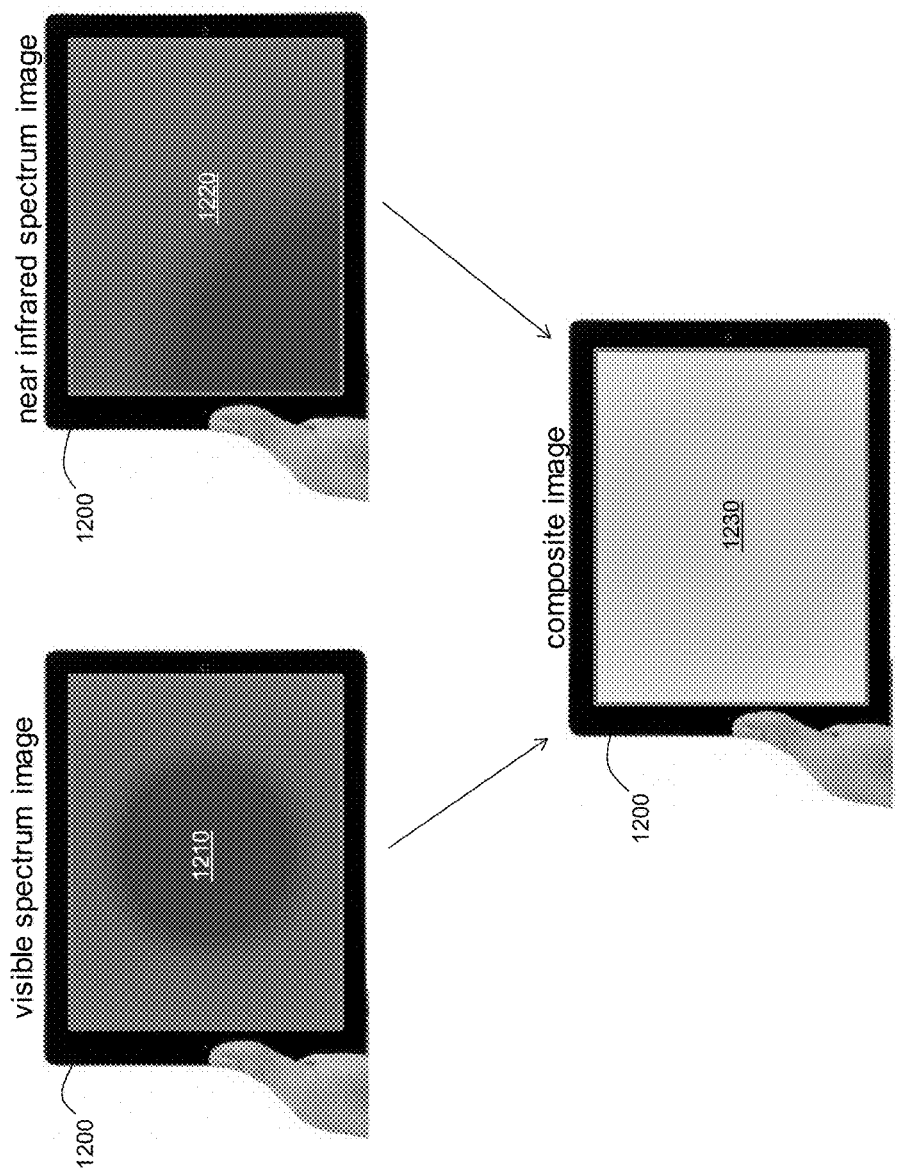
FIG. 12 illustrates an example embodiment of a real-time digital imaging and processing (RTDIP) device being used to apply and inspect a coated surface using multi-spectrum imaging.
Figure 13:
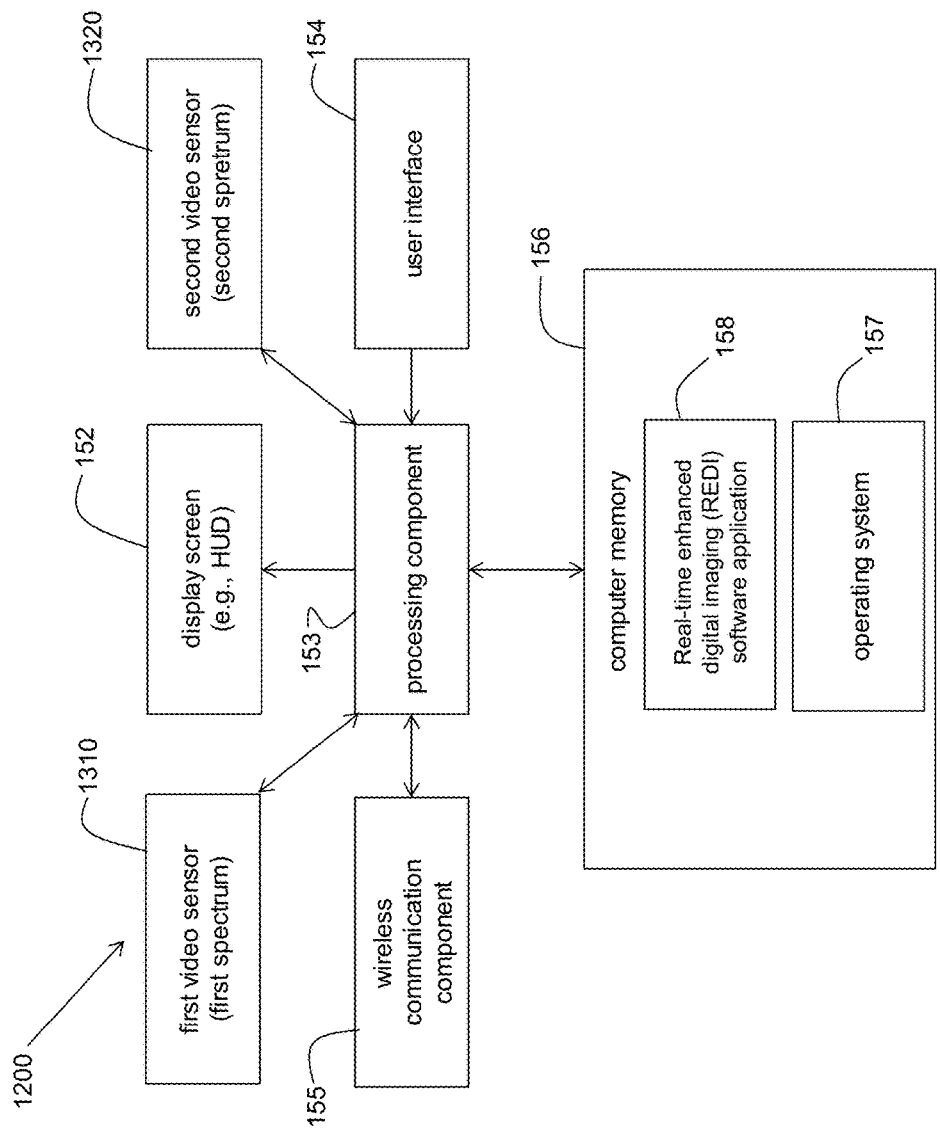
FIG. 13 illustrates a system block diagram of an example embodiment of the real-time digital imaging and processing (RTDIP) device of FIG. 12.

FIG. 12 illustrates an example embodiment of a real-time digital imaging and processing (RTDIP) device 1200 being used to apply and inspect a coated surface using dual spectrum imaging. FIG. 13 illustrates a system block diagram of an example embodiment of the real-time digital imaging and processing (RTDIP) device 1200. Instead of having a single camera 151 corresponding to a single electromagnetic frequency spectrum (e.g., visible light), the RTDIP device 1200 includes a first sensor 1310 corresponding to a first electromagnetic frequency spectrum, and a second sensor 1320 corresponding to a second electromagnetic frequency spectrum (see FIG. 13). For example, in accordance with an embodiment, the first sensor 1310 is a visible spectrum color video camera and the second sensor 1320 is a near infrared (NIR) video sensor.

A user may use the RTDIP device 1200 for coating applications or coating inspection as previously described herein. However, in the embodiment of FIG. 12, the RTDIP device 1200 simultaneously captures digital imaging data in both the first and the second frequency spectrums. FIG. 12 shows a displayed representation of the visible spectrum digital imaging data 1210 and a displayed representation of the NIR spectrum digital imaging data 1220. The RTDIP device 1200 then processes and combines the multiple sources of digital imaging data 1210 and 1220 to form digital composite imaging data 1230. Any of various combinations of the image processing techniques described herein may be used to generate the digital composite imaging data from the dual sources of digital imaging data 1210 and 1220.

As an example, referring to FIG. 12 and FIG. 13, the REDI software application 158 of the RTDIP device may employ a combination of spatial image alignment techniques, multi-spectral band ratioing techniques, thresholding techniques, and color mapping techniques in a post-application inspection mode.

In an embodiment, the two sensors 1310 and 1320 may be spatially aligned with each other in the device 1200 such that no processing has to be performed to align the image data from the two sensors. For example, lenses of the sensors may be positioned and calibrated to make sure that frames of visible spectrum data are spatially aligned with frames of NIR spectrum data. In accordance with another embodiment, alignment processing is performed to align the raw image data from the two sensors before processing to generate the digital composite imaging data 1230 is performed. For example, a spatial aligning algorithm may be employed to spatially align or match up pixels of visible spectrum data with pixels of NIR spectrum data. Such a spatial aligning algorithm may be anything from a sophisticated algorithm that implements state-of-the art aligning techniques to a simple offset routine that simply applies a known, calibrated offset to the image data in one or more spatial directions.

In accordance with an alternative embodiment, the RTDIP device may include a single multi-spectrum digital sensor, where the single sensor is able to sense both visible-spectrum and non-visible (e.g., infrared-spectrum) radiation. For example, the single sensor may include a visible-spectrum sensor array interleaved with an infrared-spectrum sensor array, allowing simultaneous capture and formation of both visible spectrum and NIR spectrum image data. Alternately, the single sensor may alternate between capturing visible-spectrum image data and NIR spectrum image data in a time-shared manner on, for example, a frame-to-frame basis. In both cases, a separate set of visible spectrum image data and NIR spectrum image data are formed and provided to the processing component 153. In such a single sensor embodiment, spatial alignment of visible spectrum image data and NIR spectrum image data is inherently achieved.

In accordance with an embodiment, the digital composite imaging data 1230 provides better discernment of applied coating thickness than either the visible spectrum digital imaging data 1210 alone or the non-visible (e.g., NIR) spectrum digital imaging data 1220 alone. This is because the visible spectrum digital imaging data 1210 provides information that the non-visible spectrum digital imaging data 1220 does not provide, and vice versa. Therefore, in accordance with an embodiment, it is the digital composite imaging data 1230 that is displayed to the user on the display screen 152, instead of the visible spectrum digital imaging data 1210 or the non-visible spectrum imaging data 1220. However, as an option, a user may be able to select, via the user interface 154, which spectral image to display (composite, visible, non-visible). Other non-visible types of electromagnetic frequency spectrums may be possible to use as well such as, for example, x-ray, ultraviolet, and microwave.

Prediction Mode

In accordance with an embodiment, an RTDIP device may be used to image an object (e.g., a room) to be painted in real-time (e.g., real-time panoramic) and process the acquired image data to apply one or more colors to surface (e.g., the walls, ceiling, or floor) of the object in the image data.

Figure 14:
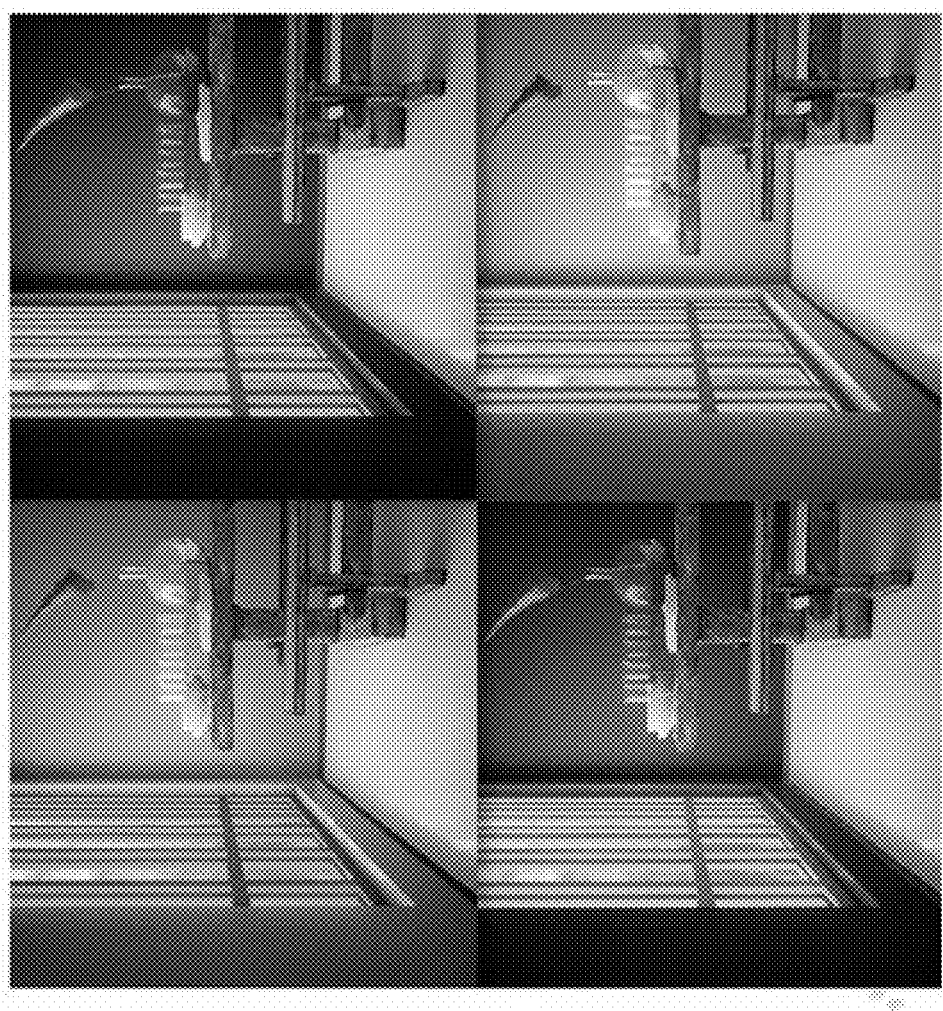
FIG. 14 illustrates an example embodiment of several digitally processed images of a room, each image digitally imposing a different color, showing how the room would appear if painted in different colors.

FIG. 14 illustrates an example embodiment of several digitally processed images of a room, each image digitally imposing a different color, showing how the room would appear if painted in different colors (e.g., shown in a split-frame mode). FIG. 14, as shown herein, is limited to gray-scale colors. However, in accordance with an embodiment, a full spectrum of visible light colors may be applied.

As an example, using a RTDIP device (e.g., in the form of a smart phone), a user may select a color from a digital color pallet or fan deck stored in the RTDIP device. The user may then image a room in real-time (or, optionally, just acquire a single image of the room). As the RTDIP device images the room, the RTDIP device processes the image data to find boundaries within the image data that define walls, floors, ceilings, and objects within the room. The RTDIP device further processes the image data to identify pixels associated with the separate walls, floors, ceilings, and objects within the room. Finally, the RTDIP device may apply the selected color to the pixels associated with, for example, the walls. In accordance with an embodiment, a user may view an image of the room on the RTDIP device and select which surfaces (walls, ceiling, floor) for which to apply the selected color (s).

In this manner, a user may view on the display of the RTDIP device how the room would look with the walls painted in the selected color. If the user does not like how the simulated painted walls look, then the user can select a different color from the digital color pallet or fan deck until the user finds an acceptable color. Once the user settles on a color, the user may order or purchase paint corresponding to that color and paint the walls accordingly.

Alternatively, instead of selecting a color directly from a digital color pallet or fan deck, the user may adjust various filters, masks, and layers that get applied to the image data to hone in on a color that is acceptable to the user. Once the user has honed in on an acceptable color, a color identifier or code may be generated by the RTDIP device that can be used to order paint corresponding to that color.

Also, in accordance with an embodiment, a user may also select a gloss type (e.g., flat, low-sheen, semi-gloss, gloss, full-gloss) in addition to a color. A combination of spectral filtering and IHS transformation may be used to establish a particular gloss type, in accordance with an embodiment.

The embodiment may also display to the user an error of predictability (i.e., a range of what the selected color/gloss might look like in a room, depending on lighting conditions and other factors).

Furthermore, in accordance with an embodiment, the RTDIP device may calculate the area (e.g., square footage) of the various walls, ceilings, and floors that are identified within the image data and provide the calculated area information to the user. In this manner, the user can determine how much paint of a particular color to order. In accordance with an embodiment, the RTDIP device uses 3D-sensing and mapping technology such as, for example, technology similar to Microsoft's KinectFusion™ to map the room in three-dimensions and determine the dimensions of individual walls, ceilings, and floors. From these dimensions, the RTDIP device can calculate the areas (e.g., square footage). Other technologies for determining the dimensions of a room are possible as well, in accordance with other embodiments (e.g., laser technology, sonar technology). Such dimension-determining techniques may also be applied for inspection and application scenarios as well, in accordance with various embodiments.

Figure 15:
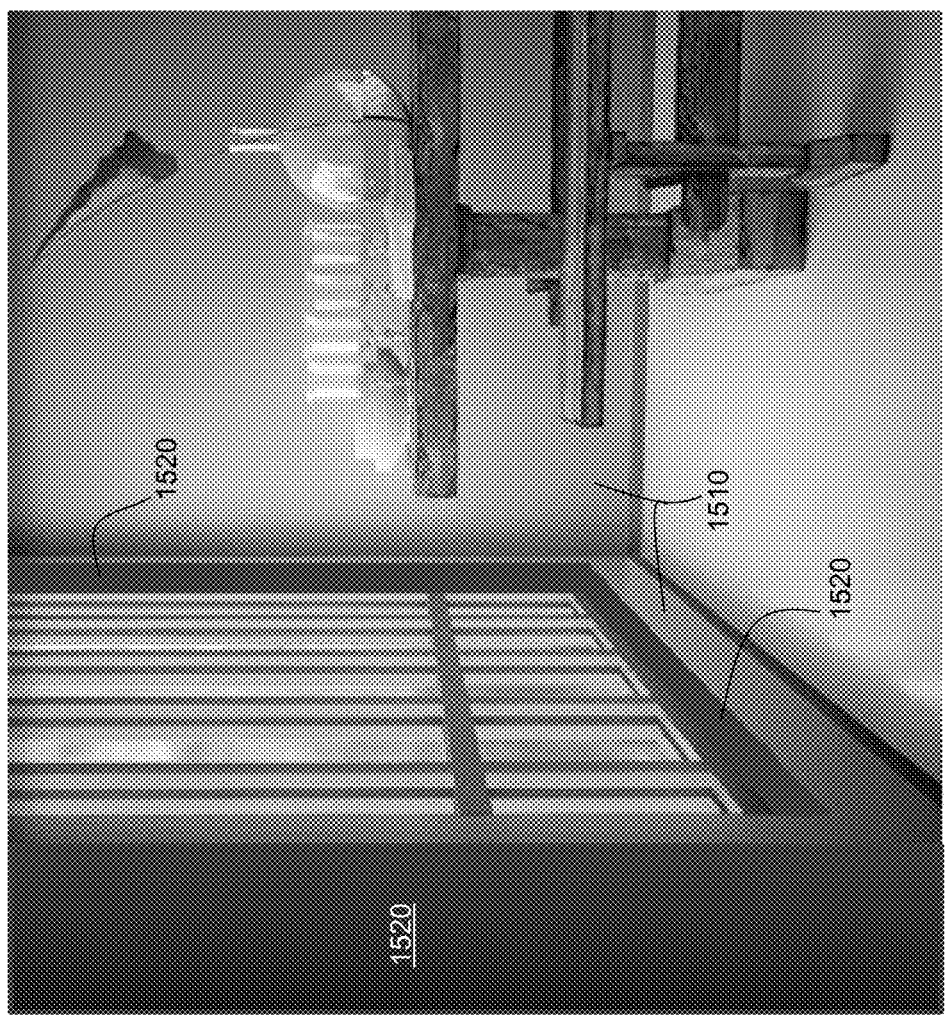
FIG. 15 illustrates an example embodiment of a digitally processed image of a room, digitally imposing two colors, showing how the room would appear if a first portion of the room were to be painted in a first color and a second portion of the room were to be painted in a second color.

FIG. 15 illustrates an example embodiment of a digitally processed image of a room, digitally imposing two colors, showing how the room would appear if a first portion of the room were to be painted in a first color 1510 and a second portion of the room were to be painted in a second color 1520. Again, a user can select or hone in on two colors and direct the RTDIP device to apply the two colors to different walls, ceilings, or floors in the image data using the techniques described herein.

As an example, referring to FIG. 14 and FIG. 15, the REDI software application 158 of the RTDIP device 540 may employ a combination of 3D-sensing and mapping techniques, spatial filtering techniques, image segmentation techniques, and color mapping techniques in a pre-application prediction mode to allow the user to view how a room would appear if painted in a particular color, in accordance with an embodiment.

Security and Law Enforcement Modes

Figure 16:
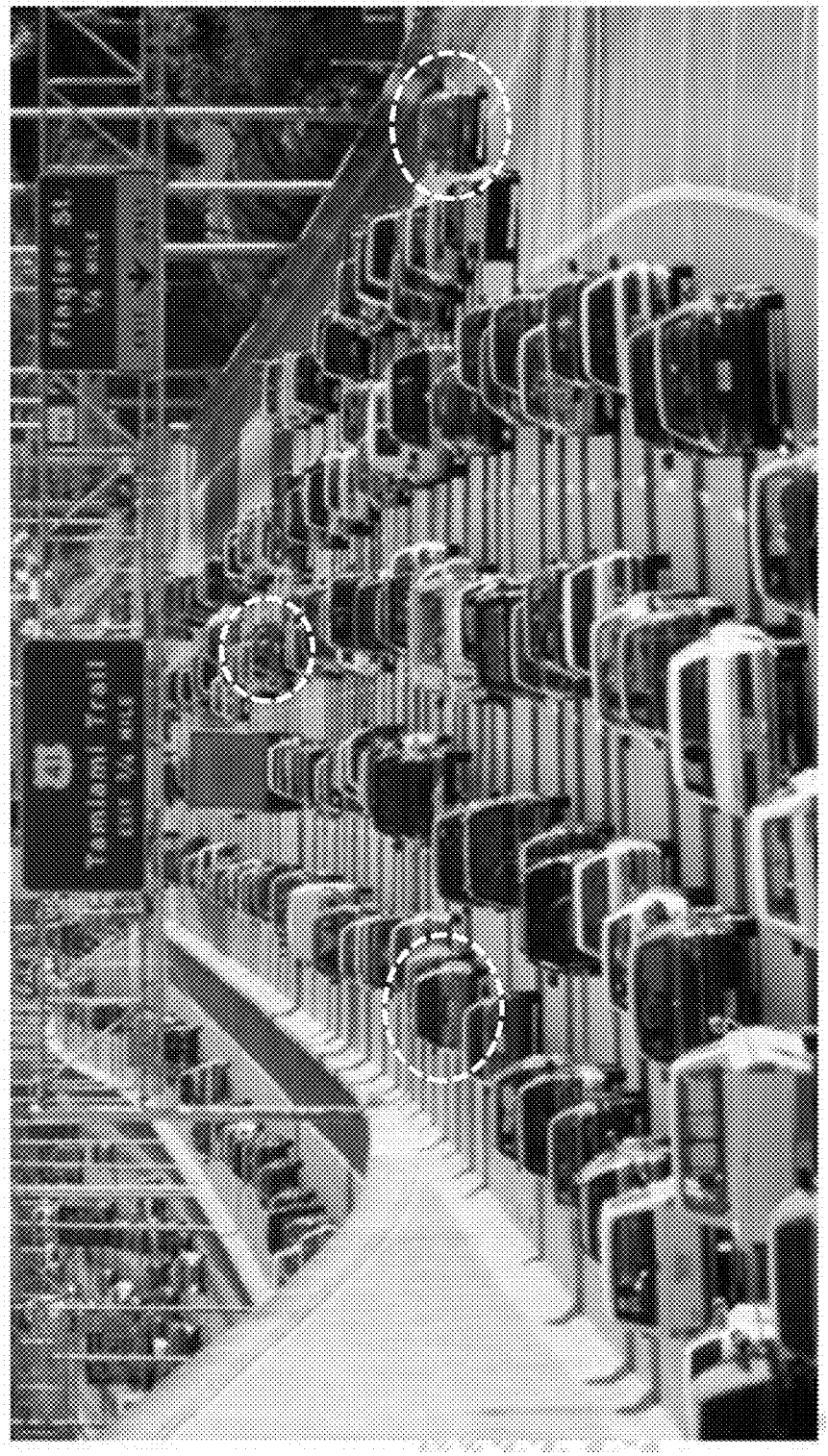
FIG. 16 illustrates an example embodiment of a digitally processed image of a scene of traffic on a highway, hi-lighting automobiles of a particular color.

FIG. 16 illustrates an example embodiment of a digitally processed image of a scene of traffic on a highway, hi-lighting automobiles of a particular color. Image data acquired by a RTDIP device can apply filters to display, for example, only cars having a particular color of blue. Such an embodiment may be useful to law enforcement when looking for a vehicle of a particular color in traffic on a busy highway. The implementation can be in real-time and the filters can be selectable by the user. In FIG. 16, the cars of interest (i.e., of a selected color) are outlined by dashed circles.

As an example, referring to FIG. 16, the REDI software application 158 of the RTDIP device 510 may employ a combination of spectral filtering techniques and temporal filtering techniques in a law enforcement mode to allow the user to view automobiles on a highway within a selected color range (e.g., a range of shades of red), in accordance with an embodiment.

Figure 17:
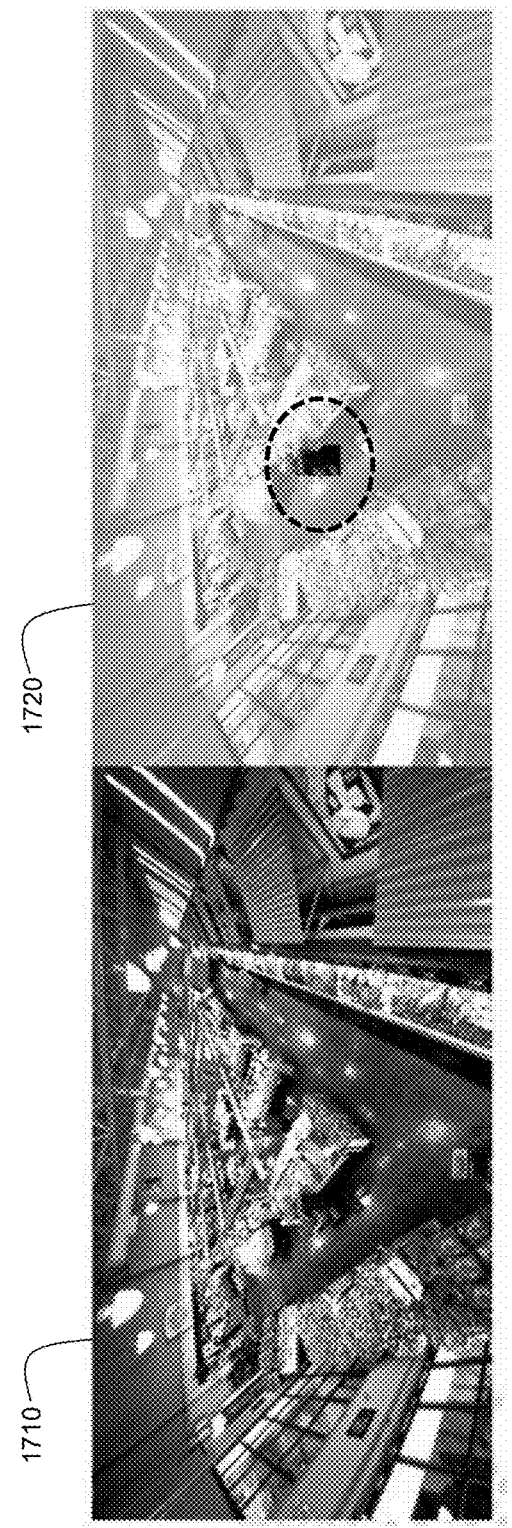
FIG. 17 shows an example embodiment of a first image of a scene of a store before image processing as well as an example embodiment of a second image of the same scene of the store after image processing to hi-light a change from the normal scene.

FIG. 17 shows an example embodiment of a first image 1710 of a scene of a store before image processing as well as an example embodiment of a second image 1720 of the same scene of the store after image processing to hi-light a change from the normal scene. A normal scene of the store may be an image of the store under certain lighting conditions when no people are present. In the processed second image 1720, the colors corresponding to the normal scene (the background) are muted or reduced (background reduction) whereas the colors corresponding to a new object (e.g., a person) in the store are enhanced. The enhanced object is outlined by a dashed circle in the second image 1720 of FIG. 17.

As an example, referring to FIG. 17, the REDI software application 158 of the RTDIP device 150 may employ a combination of image subtraction techniques, compression techniques, and IHS transformation techniques in a security mode to allow the user to view recently changed or new objects within a scene in a store, in accordance with an embodiment, as the user walks around the store wearing the RTDIP device 150.

In this manner, a security guard monitoring an image or video of the store may readily see when an intruder is in the store after hours. In accordance with an embodiment, an RTDIP device is mounted within the store producing the second image data 1720. A security guard may be located remotely from the RTDIP device, watching the second image data 1720 on a personal computer that is communicating with the RTDIP device via a communication network (e.g., similar to FIG. 8 herein). In accordance with an embodiment, the RTDIP device uses, at least in part, image subtraction techniques to discriminate between the normal scene and a new object in the store.

Other possible uses for RTDIP devices and methods include sign detection and enhancement, low-light enhancement of a scene, and processing (e.g., filtering) an image for color blind persons (e.g., allowing a color blind person to easily see when a traffic light is red or green). Furthermore, RTDIP devices and methods may be used to determine when a coating has fully cured or dried. A coating product may change color as is cures or dries (e.g., designed chromisms). However, such changes in color may be subtle to the naked eye. An embodiment of an RTDIP device can be used to allow a user to clearly discern how far along an applied coating is with respect to curing or drying. A designed chromism is a substance that experiences a reversible change in color resulting from a process caused by some form of stimulus (e.g., curing due to evaporation). Designed chromisms may be used in other scenarios, other than monitoring curing, as well.

In accordance an embodiment, the RTDIP device is able to record the digital imaging data (video or still images) for subsequent playback. In accordance with an embodiment, the RTDIP device includes a location-based services capability (e.g., using a GPS receiver) that provides for the tagging of digital imaging data (i.e., the correlation of digital imaging data to a location). In this manner, the geographic location of where digital imaging data is being acquired may be associated with the digital imaging data.

Calibration

In accordance with various embodiments, an RTDIP device may be calibrated to provide accurate and reliable use for application, inspection, and prediction scenarios. In one embodiment, a calibration process may correlate the substrate, the coating, and the light source (and other variables such as, for example, lenses) to a standard. Such calibration processes may use a stored standard for the substrate or coating, or may include acquiring and storing a still image. Similarly, a light source determination may be obtained by acquiring and storing a still image of a known standard. Such a standard may be as simple as a white piece of paper or as precise as a supplied physical standard that is, perhaps, built into or provided with the device (e.g., a color chip on the inside of a carrying case of the RTDIP device).

For example, different light sources can cause an object to appear to have different colors, depending on the light source. In accordance with an embodiment, a calibration procedure may be implemented using the RTDIP device to compensate for a light source's affect on the color of an object. For example, a "true white" color may be digitally stored in the memory of the RTDIP device that represents what a truly white object would look like under substantially ideal lighting conditions (i.e., lighting uniformly providing all colors in the visible spectrum). In this manner, the RTDIP device can "know" what a "truly white" object looks like under ideal lighting conditions.

Next, an image may be acquired using the RTDIP device, under current (e.g., non-ideal) lighting conditions, of a white piece of paper or some other physical standard object that is known to be white. The RTDIP device can then compare the stored "true white" color to the color of the acquired image of the white object under the current, non-ideal lighting conditions, to generate a compensation value. This compensation value may subsequently be applied to acquired images of a substrate or a coating under the current lighting conditions to compensate for the non-ideal lighting conditions.

In this manner, digital imaging data being representative of the true colors of the substrate or the coating may be generated by the RTDIP device. Once this calibration for lighting conditions is achieved, subsequent image processing of the acquired digital imaging data may be performed to provide better discernment between colors in the digital imaging data (e.g., to more readily discern between coating thicknesses).

As another example of calibration, when a candidate substrate is about to be inspected for contamination before coating, the RTDIP device can provide a loaded standard of what an uncontaminated (ideal) substrate looks like. The loaded standard of the ideal substrate may be derived from acquiring digital imaging data of an clean, uncontaminated substrate under "ideal" lighting conditions, for example. Any subsequently acquired images of a candidate substrate, possibly having contamination, may be compared to the loaded standard to generate difference data. The difference data can be used by the RTDIP device to create an image for display that shows where contamination exists on the candidate substrate.

Furthermore, once the candidate substrate is cleaned and determined to be free of contamination, an image of that clean candidate substrate may be acquired under the current lighting conditions and compared to the loaded standard to determine a compensation value that may subsequently be applied to acquired digital imaging data as the candidate substrate is being coated. In this manner, compensation for differences in coating color due to the underlying substrate may achieved and accurate estimates of coating thickness may be determined.

As a further example of calibration, post-application inspection may be performed long after (e.g., years after) a coating has been applied to a substrate. An image of a cured coating may be acquired by an RTDIP device shortly after the coating has been applied. Another image of the coating can be acquired much later and compared to the original coating. The coating may be designed to have chromic characteristics such that the color of the coating may change with pH, abrasion, temperature, or some other environmental parameter. For example, a coating may be designed to change color when corrosion develops under the coating (e.g., between the coating and the substrate). An RTDIP device may be configured to compare the original image (e.g., acquired years earlier) to the current image to detect and enhance such a change in color due to corrosion, allowing an inspector to determine any developing corrosion problems, even though the substrate is still coated.

In accordance with specific embodiments, a spectral response obtained from an enhanced image may include a color of a coating material that is a plural component system. The plural component system includes two or more components that are combined (e.g., mixed) together to produce the coating material (e.g., paint). In a first embodiment, the components are combined together at a factory that manufactures the coating material. The factory might have a proportioner (proportioning device) that proportions the components to provide a predetermined (prescribed, desired) volumetric mix ratio. The proportioner might have a purely mechanical mechanism for controlling mix ratio (component proportions), or might be processer-controlled (e.g., computer controlled). In a second embodiment, the two or more components are provided as a "kit" by the manufacture and combined (e.g., mixed) together at a job site by a user (person) that will apply (e.g., spray) the coating onto the substrate (e.g., wall surface). In this second embodiment, a curing process might start when the components are combined (e.g., mixed together), giving the user a limited amount of time to apply the coating material (e.g., mixture) to the substrate before the coating sets. Applying the mixture might be by means of a sprayer. The sprayer might receive (e.g., through a tube) the mixture from an outlet of a proportioner (proportioning device). The proportioner might have two or more inlets to receive the two or more components. Each component might be contained in a component container (e.g., pail), from which the respective component is drawn through a tube into a respective inlet of the proportioner. The proportioner might have a dial with which the user sets a predetermined (prescribed, desired) mix ratio that is specified by the manufacturer. The proportioner might have a purely mechanical mechanism for controlling mix ratio (component proportions), or might be processer-controlled (e.g., computer controlled). In either the first or second example mentioned above, the components might exhibit metamerism, in that they are metamers of each other, in that their respective colors appear to be the same when viewed under a first light source and appear to be different when viewed under a different second light source. Accordingly, first spectral data acquired from the coating under the first light source and second spectral data acquired from the coating under the second light source can be used (e.g., through formula or table lookup) to determine the actual mix ratio. Spectral data from more than two light sources may be used (e.g., through formula or table lookup) to determine the actual mix ratio, which is especially useful for a multi-component system of more than two components.

When multiple components are mixed/combined to form the coating material, a specific mix ratio is required to achieve the desired performance. The coating material exhibits a color different than those of the components, and the color of the coating material is related to the mix ratio of the components. In accordance with one embodiment, a first component has a color A and a second component has a color B. When these two components are mixed/combined in a coating material, the coating material may exhibit a color C which can be visually enhanced and quantified with the REDI technology described herein and correlated to the mix ratio of the two components.

Referring back to FIG. 2, the functionality provided by the REDI software application 158 can be configured (i.e., programmed) for mix ratio determination. In accordance with specific embodiments, the software encoded instructions are configured (i.e., programmed) to determine an interrelationship between spectral responses and mix ratio. For example, an original image is taken from a self-inspecting material applied to a substrate surface. The REDI software application 158 performs one or more image enhancement operations to generate an enhanced image. A spectral response with respect to a light source is determined from the enhanced image. A measurement of the mix ratio is performed, and the measured mix ratio is stored together with the spectral response in a data structure in the computer memory 156. The above-noted process continues to collect a number of data points of spectral responses and mix ratios. The software encoded instructions are configured (i.e., programmed) to determine a formula indicating the interrelationship between spectral responses and mix ratios based on the collected data points, e.g., using a linear regression method. For example, the formula indicates that the coating material has a spectral response based on a mix ratio, given a particular substrate surface and a particular light source. In accordance with an embodiment, the REDI software application 158 may then be configured to determine a mix ratio using the formula based on a spectral response obtained from an enhanced image.

In accordance with some embodiments, the collected data points of spectral responses and mix ratios may be stored into a database in the computer memory 156 which maps spectral responses to mix ratios. The REDI software application 158 then performs a database inquiry to read out a mix ratio from the database corresponding to a spectral response of the self-inspecting coating material obtained from the enhanced image.

In accordance with some embodiments, multiple factors of a single coating may be measured independently or in parallel with the REDI technology. For example, a plural component coating can be designed to have a spectral response related to film thickness and a spectral response related to mix ratio both of which can be measured using the REDI technology. These spectral responses may be dependent on each other, permitting only one to be measured at a given time, or independent of each other so that both can be measured in parallel. In accordance with certain embodiments, a measured coating thickness and a measured mix ratio are stored together with the corresponding spectral response in a data structure in the computer memory 156. The above-noted process continues to collect a number of data points of spectral responses, coating thicknesses and mix ratios. The software encoded instructions are configured (i.e., programmed) to determine one or more formulas indicating the interrelationship between spectral responses with respect to coating thicknesses and/or mix ratios based on the collected data points. In accordance with an embodiment, the REDI software application 158 may then be configured to analyze both coating thickness and mix ratio based on a spectral response obtained from an enhanced image.

In accordance with some embodiments, the collected data points of spectral responses, coating thicknesses, and mix ratios may be stored into a database in the computer memory 156 which maps spectral responses to coating thicknesses and mix ratios. The REDI software application 158 then performs a database inquiry to read out a coating thickness and a mix ratio from the database corresponding to a spectral response of the self-inspecting coating material obtained from the enhanced image.

In accordance with a specific embodiment, metamers of like color may be incorporated into separate components of a plural component coating creating metamerism in the mixed coating that can be used to measure the mix ratio of the coating using the REDI technology. For example, colors of two different components of the coating material may match under a specific light source, but if the spectral power distributions of the two components do not match, the color will not match under other light sources. When mixed, the resulting metamerism of the coating material may be proportionally related to the mix ratio of different components in the coating and can be analyzed using multiple light sources and correlated for mix ratio determination using the REDI technology described herein. Because the second light source used to measure metamerism provides a spectral response independent of that of film thickness, it is possible to measure both the film thickness and the mix ratio of the same coating in parallel using the REDI technology.

In accordance with some embodiments, a spectral response obtained from an enhanced image may include a recognizable spectral fingerprint of a non-visible component. When the non-visible component is mixed into one of the components of a plural component coating material, the coating material retains a same visible color, and the invisible spectral response associated with the spectral fingerprint of the non-visible component may be enhanced and quantified using the REDI technology and correlated to the mix ratio. Because the non-visible component can provide a spectral response independent of that of film thickness, it is possible to measure both the film thickness and the mix ratio of the same coating in parallel using the REDI technology.

The spectral data may be acquired (e.g., by camera) from a coating, of a mixture, that is applied to (e.g. sprayed onto) a substrate. Alternatively, the spectral data may be acquired from the mixture while the mixture is in a container (e.g., bucket).

In summary, systems and methods providing real-time enhanced digital imaging for the prediction, application, and inspection of coatings are disclosed. A real-time digital imaging and processing device provides real-time image acquisition, processing, and display of acquired digital imaging data to allow a user to discern coating and/or substrate variations beyond that which can be discerned with the naked eye. The real-time digital imaging and processing device may also provide pre-coating and post-coating inspection capabilities as well as coating prediction capabilities.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

For example, the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

Figure 18:
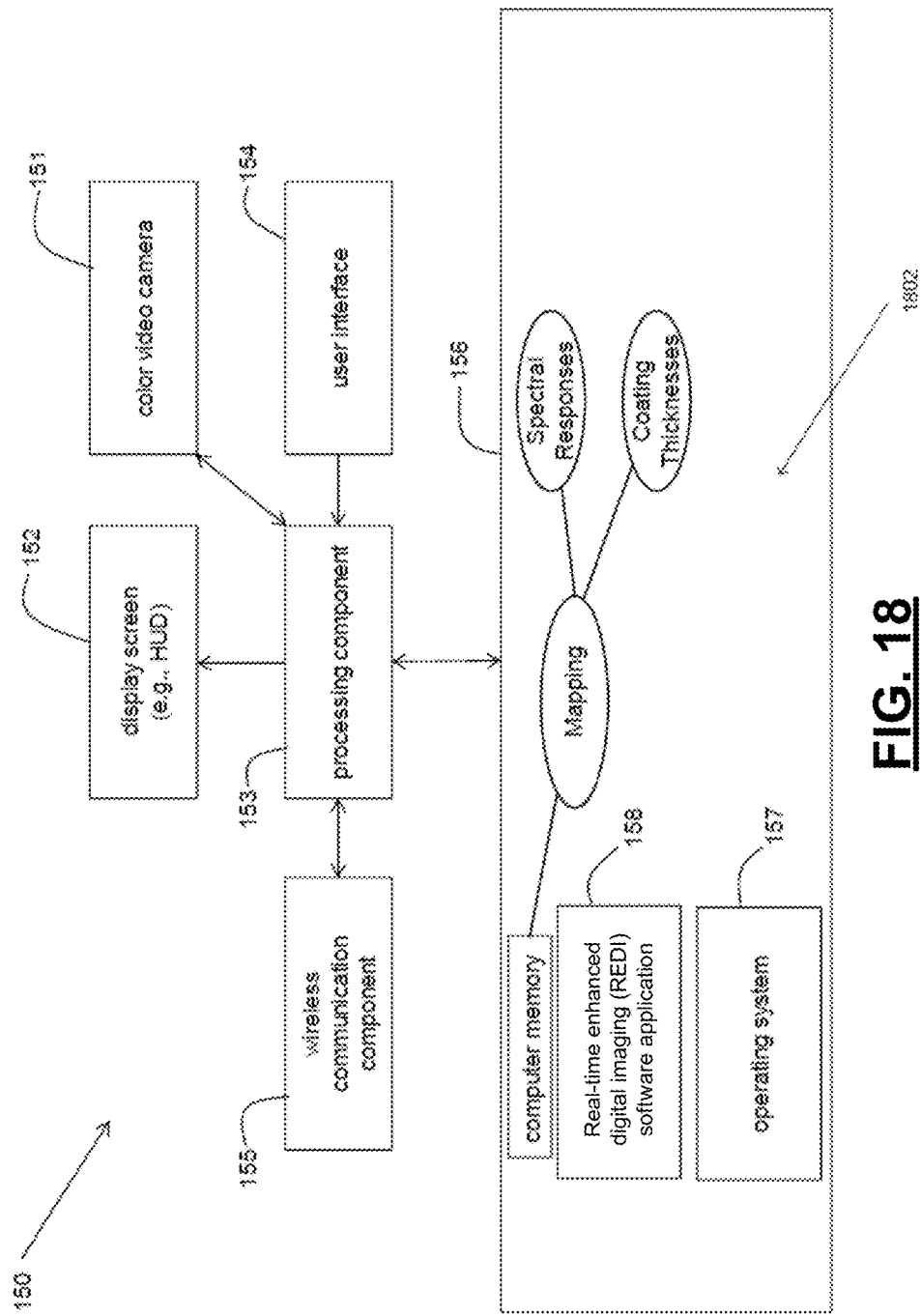
FIGS. 18-21 depict data structures of various embodiments involving the mapping of spectral responses with coating thicknesses.

As an illustration, FIG. 18 depicts at 1802 data structures that can be used within the systems and methods described herein. The data structures 1802 include a mapping data structure that interrelates spectral responses with coating thicknesses. The data structures 1802 can include separate database fields for storing values of spectral responses with their associated coating thicknesses. In this way, a particular spectral response can be used to determine the thickness of a particular coating. If an exact value cannot be obtained for a particular spectral response, then interpolation between two of the closest spectral response values is used to determine a coating thickness. In another example, the data structures 1802 can store a formula or function to map or interrelate spectral responses with coating thicknesses.

Figure 19:
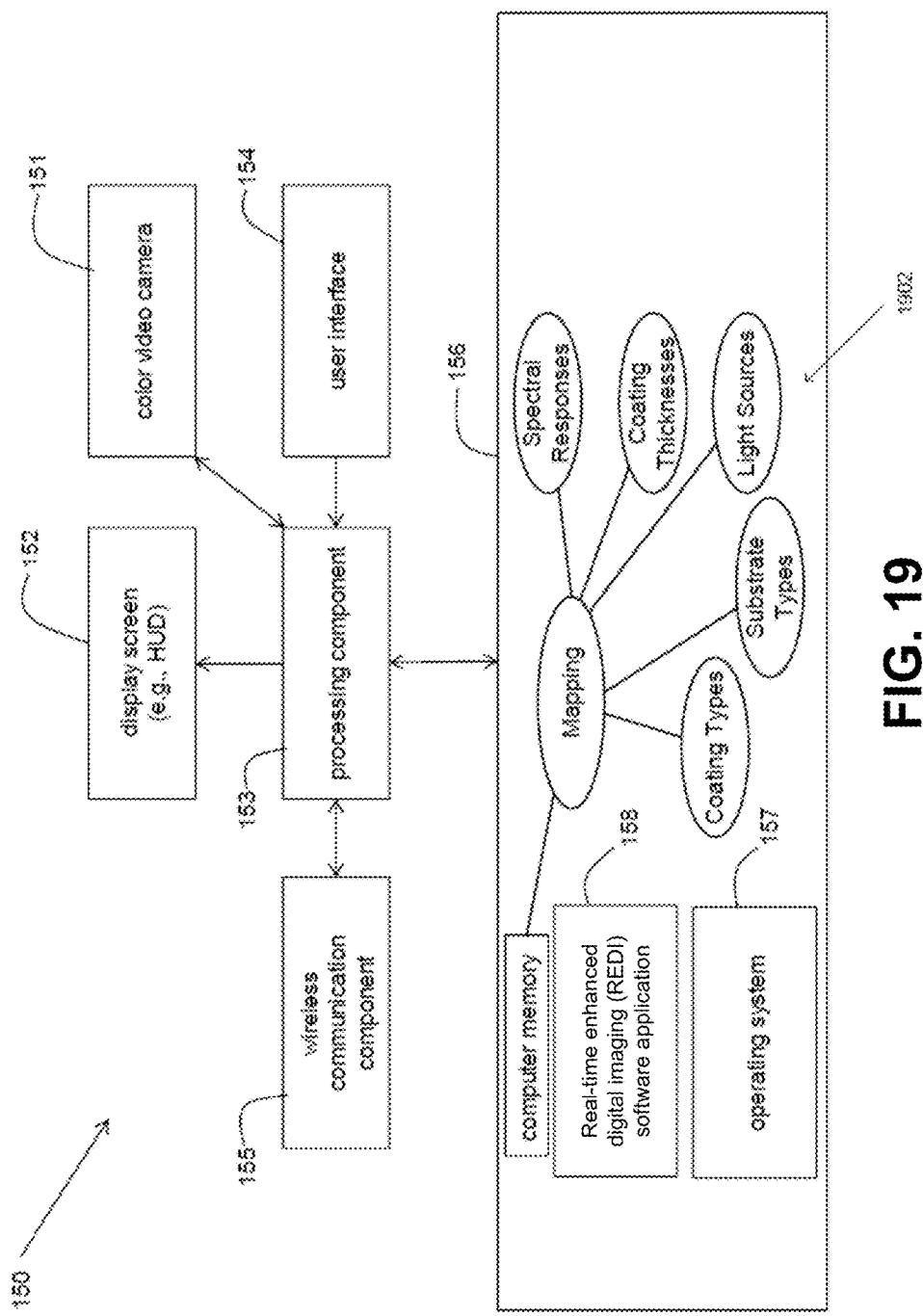

It should be understood that the data structures 1802 can be extended in many different ways to suit the application at hand. For example, the mapping data structures can be extended as shown at 1902 on FIG. 19. In FIG. 19, the interrelationships between spectral responses and coating thicknesses are specific to light sources, substrate types, coating types, etc. This can be useful in many different situation, such as to minimize the effect of metamerism where a coating may appear to have different colors under different lighting sources.

Figure 20:
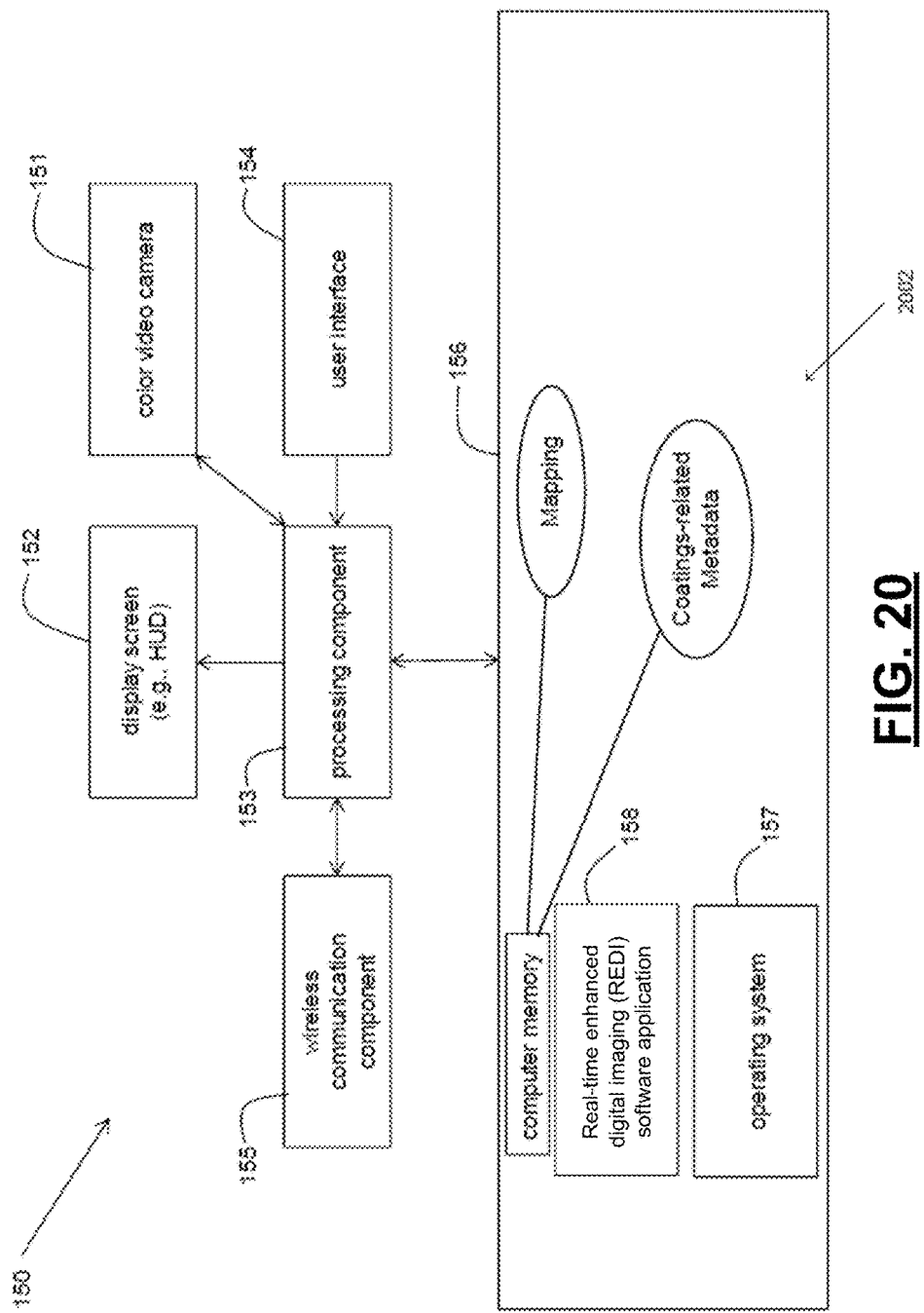

As another example, FIG. 20 depicts at 2002 the use of data structures containing coatings-related metadata. The coatings-related metadata can include capturing along with the image data and spectral response data such metadata as the location, orientation, time/date, duration, product, lot number, and device/operator associated with the application of a coating upon a substrate.

Figure 21:
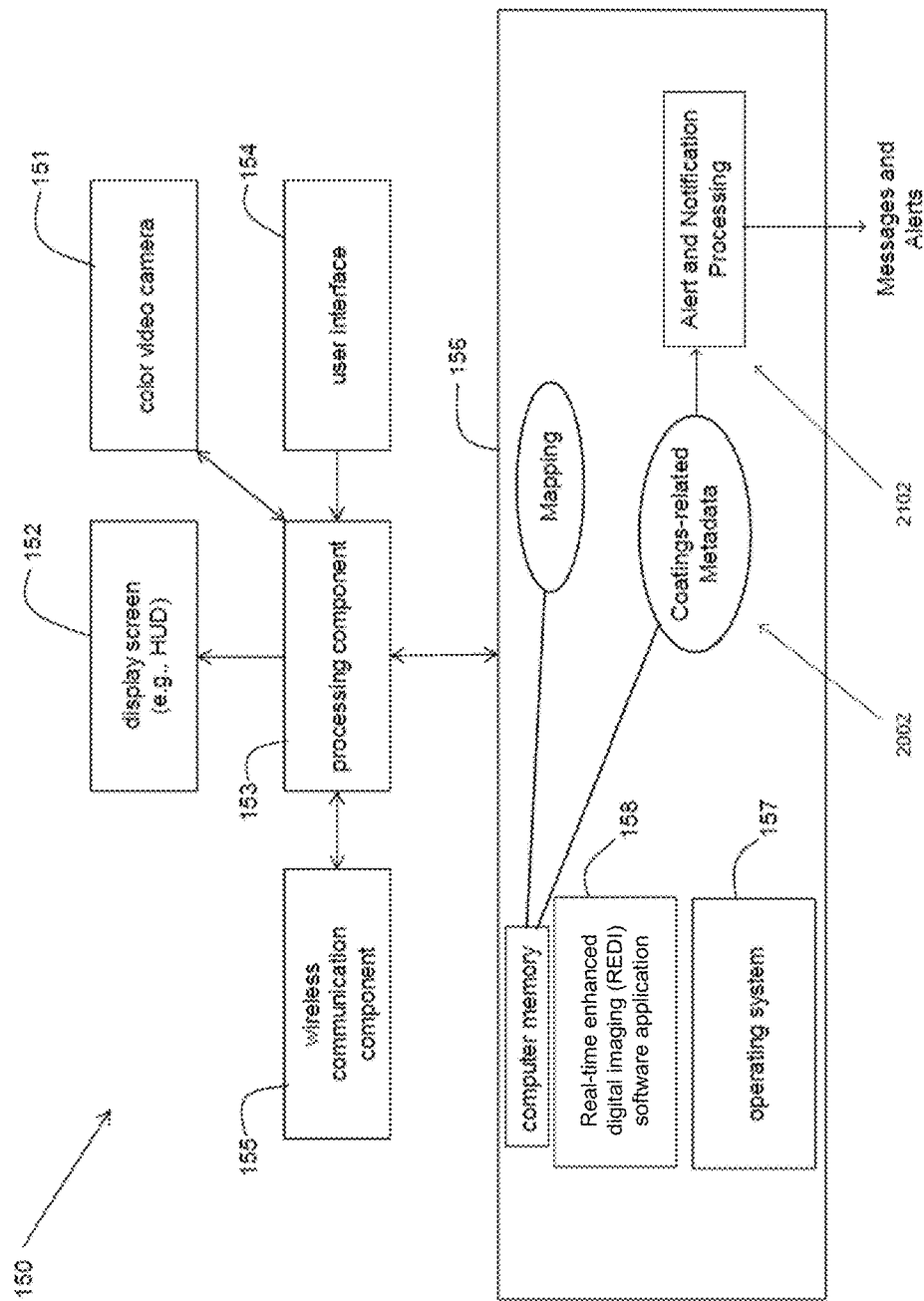

FIG. 21 depicts at 2102 that the coating-related metadata can be used for such purposes as alert and notification operations. For example, if the thickness of an applied coating as determined by one or more of the approaches disclosed herein is out of tolerance, then an alert is determined, and notification is sent to one or more personnel, including the operator of the coating equipment as well as the supervisor. The metadata can also be used in an inspection capacity where metadata is used to identify that a particular coating does not have the proper mix ratio. For example, the coating can be identified via an optical identifier (e.g., a QR code). The color visualization approaches disclosed herein are used to detect that the mix ratio for the coating is not proper. This results in an alert notification being sent to a batch mixing computer system to adjust the coating composition to a proper mix ratio. Various other users who receive the alert notification can include supervisors and operators of the batch mixing systems.

An example method performed by an electronic device includes storing a correlation between spectral data values and mix ratio values of components of a mixture. Spectral data is acquired from a coating, of the mixture, applied to a substrate. A mix ratio of the coating is determined from the acquired spectral data based on the stored correlation.

The correlation might comprise a formula defining mix ratio as a function of spectral data, such that the mix ratio is determined from the coating's spectral data using the formula. Alternatively, the correlation might comprise a table of data points in which each data point includes a mix ratio value and a corresponding spectral data value, such that the mix ratio is determined from the acquired spectral data by a table lookup. Before determining the mix ratio, the acquired spectral data might be adjusted by enhancing spectral response differentiation of the acquired spectral data. Acquiring the spectral data and determining the mix ratio might be performed while the mixture is being applied to the substrate, or after the mixture has cured on the substrate.

In an embodiment, the stored correlation might indicate both (i) a first relationship between mix ratio values and spectral data values based on a first light source and (ii) a second relationship between mix ratio values and spectral data values based on a second light source. The spectral data may be acquired under a particular light source, and the mix ratio may be determined based on the first relationship if the particular light source corresponds to the first light source and based on the second relationship if the particular light source corresponds to the second light source.

In an embodiment, the stored correlation might relate mix ratio values to a combination of first spectral data relating to a first lighting source and second spectral data relating to a second lighting source. The acquired spectral data includes first acquired spectral data acquired using the first light source and second acquired spectral data acquired using the second light source. The mix ratio is determined based on correlation and the first and second acquired spectral data. The coating includes first and second metamers that visually appear to have a same color but whose spectral distributions differ. The determined mix ratio is indicative of a concentration ratio of the first metamer relative to the second metamer.

In an embodiment, the spectral data values include spectral data values for different colors. The spectral data values also includes spectral data values for wavelengths that are outside the visible spectrum. In response to determining that the mix ratio is out of tolerance, an alert is sent to a batch mixing system to adjust a coating composition of a coating being prepared by the batch mixing system.

In an embodiment, the correlation is a first correlation, and the method further includes storing a second correlation between spectral data values and coating thickness values, and determining a thickness of the coating based on the second correlation and the acquired spectral data.

In an embodiment, the coating is applied to the substrate by spraying the mixture onto the substrate. The acquiring of the spectral data and determining of the mix ratio is performed while the coating on the substrate is still liquid. A determination, based on the determined thickness, is made whether to continue spraying the mixture to increase thickness of the coating.

In an embodiment, the coating is a first coating of the mixture, the acquired spectral data is first spectral data, and the correlation is a first correlation between spectral data values and mix ratio values and relates to a predetermined coating thickness. The method includes storing a second correlation between spectral data values and thickness values that depends on mix ratio. The first coating of the mixture is applied at the predetermined coating thickness. First spectral data from the first coating is acquired. The mix ratio of the first coating is determined from the acquired first spectral data based on the first correlation. A second coating of the mixture is applied at an undetermined thickness to the substrate. The second spectral data is acquired from the second coating. The thickness of the second coating is determined based on the second correlation and the acquired spectral data. In the above example, the first spectral data is obtained from a coating, of the mixture, at a predetermined thickness. Alternatively, the first spectral data might be acquired from the mixture while the mixture is pooled in a container and has a depth (between top and bottom of the mixture in the container) that provides the same spectral data as if the mixture had infinite depth.

In an embodiment, while the coating is being applied to the substrate, the electronic device is supported by a person that is applying the coating to the substrate. The correlation might be generated by, for each of multiple coatings, acquiring spectral data of the respective coating and measuring a thickness of the respective coating, and then generating the correlation, as a formula or database table that correlates spectral data to coating thickness.

The systems, methods, software instructions may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A method comprising:
   storing a correlation between spectral data values and mix ratio values of components of a mixture;
   acquiring spectral data from a coating, of the mixture, that is applied to a substrate; and
   determining, from the acquired spectral data, a mix ratio of the components that are in the coating based on the correlation;
   wherein the mix ratio is used by a batch mixing system to prepare a new coating mixture,
   wherein the storing, acquiring and determining are performed by an electronic device.

2. The method of claim 1, wherein the correlation comprises a formula defining mix ratio as a function of spectral data, and the mix ratio is determined from the coating's spectral data using the formula.

3. The method of claim 1, wherein the correlation comprises a table of data points in which each data point includes a mix ratio value and a corresponding spectral data value, and the mix ratio is determined from the acquired spectral data by a table lookup.

4. The method of claim 1, further comprising, before determining the mix ratio, adjusting the acquired spectral data by enhancing spectral response differentiation of the acquired spectral data.

5. The method of claim 1, wherein determining the spectral data and determining the mix ratio is performed while the mixture is being applied to the substrate.

6. The method of claim 1, wherein acquiring the spectral data and determining the mix ratio is performed after the mixture has cured on the substrate.

7. The method of claim 1, wherein:
   the stored correlation indicates (i) a first relationship between mix ratio values and spectral data values based on a first light source and (ii) a second relationship between mix ratio values and spectral data values based on a second light source;
   the acquired spectral data is acquired under a particular light source; and
   the mix ratio is determined based on the first relationship if the particular light source corresponds to the first light source and is based on the second relationship if the particular light source corresponds to the second light source.

8. The method of claim 1, wherein:
   the stored correlation relates mix ratio values to a combination of first spectral data relating to a first lighting source and second spectral data relating to a second lighting source;
   the acquired spectral data includes first acquired spectral data acquired using the first light source and second acquired spectral data acquired using the second light source; and
   the mix ratio is determined from the first and second acquired spectral data based on the stored correlation.

9. The method of claim 8, wherein:
   the coating includes first and second metamers that visually appear to have a same color but whose spectral distributions differ; and
   the determined mix ratio is indicative of a concentration ratio of the first metamer relative to the second metamer.

10. The method of claim 1, wherein the spectral data values include spectral data values for different colors.

11. The method of claim 1, wherein the spectral data values include spectral data values for wavelengths that are outside the visible spectrum.

12. The method of claim 1, further comprising:
determining whether the mix ratio is out of tolerance; and
in response to determining that the mix ratio is out of tolerance, sending, an alert to the batch mixing system to adjust a coating composition of the new coating being prepared by the batch mixing system.

13. The method of claim 1, wherein the correlation is a first correlation, and the method further comprises:
storing a second correlation between spectral data values and coating thickness values; and
determining, by the electronic device, a thickness of the coating based on the second correlation and the acquired spectral data.

14. The method of claim 13, wherein:
the coating is applied to the substrate by spraying the mixture onto the substrate;
acquiring of the spectral data and determining of the mix ratio is performed while the coating on the substrate is still liquid; and
the method further comprises determining, based on the determined thickness, whether to continue spraying the mixture to increase thickness of the coating.

15. The method of claim 1, wherein the coating is a first coating of the mixture, the acquired spectral data is first spectral data, the correlation is a first correlation between spectral data values and mix ratio values and relates to a predetermined coating thickness, and the method further comprises:
storing a second correlation between spectral data values and thickness values that depends on mix ratio;
applying the first coating of the mixture at the predetermined coating thickness;
acquiring first spectral data from the first coating;
determining the mix ratio of the first coating from the acquired first spectral data based on the first correlation;
applying a second coating of the mixture, at an undetermined thickness, to the substrate;
acquiring second spectral data from the second coating; and
determining the thickness of the second coating based on the second correlation and the acquired second spectral data.

16. The method of claim 1, wherein, while the coating is being applied to the substrate, the electronic device is being supported by a person that is applying the coating to the substrate.

17. The method of claim 1, further comprising, before storing of the correlation, generating the correlation by:
for each of multiple coatings, acquiring spectral data of the respective coating, and measuring a thickness of the respective coating; and
generating the correlation as a formula or database table that correlates spectral data to coating thickness.

18. The method of claim 1, wherein curing of the mixture is initiated when the components are mixed together.

19. An electronic device comprising:
a non-transitory data storage medium configured to store a correlation between spectral data values and mix ratio values of components of a mixture;
a camera configured to acquire spectral data from a coating, of the mixture, that is applied to a substrate; and
a processor configured to determine, from the acquired spectral data, a mix ratio of the components that are in the coating based on the stored correlation;
wherein the mix ratio is used by a batch mixing system to prepare a new coating mixture.

20. A non-transitory processor readable storage medium storing program instructions configured to be executed by a processor to:
store a correlation between spectral data values and mix ratio values of components of a mixture;
receive, from a camera, acquired spectral data from a coating, of the mixture, that is applied to a substrate; and
determine, from the acquired spectral data, a mix ratio of the components that are in the coating based on the stored correlation;
wherein the mix ratio is used by a batch mixing system to prepare a new coating mixture.

* * * * *